US009613657B2

(12) United States Patent
Momoo et al.

(10) Patent No.: US 9,613,657 B2
(45) Date of Patent: Apr. 4, 2017

(54) RECORDING AND REPRODUCING APPARATUS

(71) Applicant: Panasonic Intellectual Property Management Co., Ltd., Osaka (JP)

(72) Inventors: Kazuo Momoo, Osaka (JP); Yuichi Takahashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/042,549

(22) Filed: Feb. 12, 2016

(65) Prior Publication Data

US 2016/0267939 A1     Sep. 15, 2016

(30) Foreign Application Priority Data

Mar. 11, 2015  (JP) ................................. 2015-048861

(51) Int. Cl.
    *G11B 7/0045* (2006.01)
    *G11B 20/18* (2006.01)
    *G11B 20/10* (2006.01)
(52) U.S. Cl.
    CPC ........ *G11B 20/1879* (2013.01); *G11B 7/0045* (2013.01); *G11B 20/10305* (2013.01)
(58) Field of Classification Search
    None
    See application file for complete search history.

(56) References Cited

U.S. PATENT DOCUMENTS

| 7,068,571 B2* | 6/2006 | Tsukihashi | G11B 7/0045 369/44.29 |
| 2002/0159347 A1* | 10/2002 | Sasaki | G11B 7/00375 369/44.37 |
| 2007/0159951 A1* | 7/2007 | Sagara | G11B 7/13927 369/106 |
| 2008/0112287 A1* | 5/2008 | Yoshimoto | G06F 3/0601 369/47.53 |
| 2010/0157780 A1* | 6/2010 | Hayashi | G11B 20/10009 369/124.14 |
| 2013/0051203 A1* | 2/2013 | Mahnad | G11B 7/1395 369/44.38 |
| 2013/0083640 A1* | 4/2013 | Takahashi | G11B 7/1263 369/53.26 |

FOREIGN PATENT DOCUMENTS

| JP | 57-088532 A | 6/1982 |
| JP | 09-091704 A | 4/1997 |

* cited by examiner

*Primary Examiner* — Peter Vincent Agustin
(74) *Attorney, Agent, or Firm* — Renner, Otto, Boisselle & Sklar, LLP.

(57) ABSTRACT

The recording and reproducing apparatus according to the present disclosure includes: a light source; an optical system configured to divide a beam from the light source, and to form a first optical spot and a second optical spot on a recording medium; a recording circuit configured to drive the light source and to modulate a light amount of the light source, and further to record the information on the recording medium by the first optical spot by modulating the light amount of the light source based on information; and an evaluation circuit configured to evaluate the information recorded on the recording medium by reproducing by the second optical spot in a period in which the recording circuit causes the light source to emit the beam at a constant light amount.

11 Claims, 16 Drawing Sheets

RECORDING AND REPRODUCING APPARATUS

BACKGROUND OF THE INVENTION

1. Field of the Invention

The present disclosure relates to a recording and reproducing apparatus which records information in a recording medium and reproduces information from a recording medium.

2. Description of the Related Art

Unexamined Japanese Patent Publication No. 9-91704 discloses a recording and reproducing apparatus which includes two optical spots. Another optical spot detects information recorded by a preceding optical spot, so that this recording and reproducing apparatus can record information with high quality.

CITATION LIST

Patent Literature

PTL 1; Unexamined Japanese Patent Publication No. 9-91704

SUMMARY OF THE INVENTION

The present disclosure relates to a recording and reproducing apparatus which, when recording information on a recording medium, reproduces and evaluates information immediately after the recording.

The recording and reproducing apparatus according to the present disclosure includes a light source; an optical system configured to divide a beam from the light source, and to form a first optical spot and a second optical spot on a recording medium; a recording circuit configured to drive the light source and to modulate a light amount of the light source, and further to record the information on the recording medium by the first optical spot by modulating the light amount of the light source based on information; and an evaluation circuit configured to evaluate the information recorded on the recording medium by reproducing by the second optical spot in a period in which the recording circuit causes the light source to emit the beam at a constant light amount.

When recording information on a recording medium, the recording and reproducing apparatus according to the present disclosure can reproduce and evaluate information immediately after the recording.

DETAILED DESCRIPTION OF THE PREFERRED EMBODIMENTS

Exemplary embodiments will be described in detail below optionally with reference to the drawings. In this regard, the exemplary embodiments will not be described in detail more than necessary. For example, matters which have already been well known and substantially the same components will not be described again in some cases. This is to prevent the following description from unnecessarily becoming redundant and help one of ordinary skill in the art easily understand the exemplary embodiments.

In addition, the accompanying drawings and the following description are provided to help one of ordinary skill in the art sufficiently understand the disclosure, and do not intend to limit a subject matter recited in the claims.

(First Exemplary Embodiment)

Next, the first exemplary embodiment will be described with reference to FIGS. 1 to 4.

[1-1. Object]

There is a Direct Read After Write (DRAW) method as means for improving recording and reproducing quality for an optical disc which is an example of a recording medium. This is to improve recording and reproducing quality by irradiating an optical disc with two optical spots which are an optical spot for recording and an optical spot for reproducing, by reproducing information by the optical spot for reproducing immediately after recording the information by the optical spot for recording, and by evaluating a recording state.

A method for irradiating an optical disc with two optical spots includes a method for using two light sources of a light source for reproducing and a light source for recording. However, this method has a problem that use of the two light sources increases cost and it is difficult to ensure accuracy to focus each optical spot from the two light sources, on a same track.

Further, another method for irradiating an optical disc with two optical spots includes a method for dividing a beam of a single light source, forming the two optical spots, and irradiating the optical disc with the two optical spots. When this method is used, a configuration of the method is relatively simple yet. A light source is modulated to record information by an optical spot for recording. Therefore, the modulated waveform is superimposed on an optical spot for reproducing and gives influences significantly on reproducing information.

Therefore, the present disclosure provides a high quality recording and reproducing apparatus which ensures good reproducing signal quality upon DRAW of using a single light source.

[1-2. Configuration]

Figure 1:
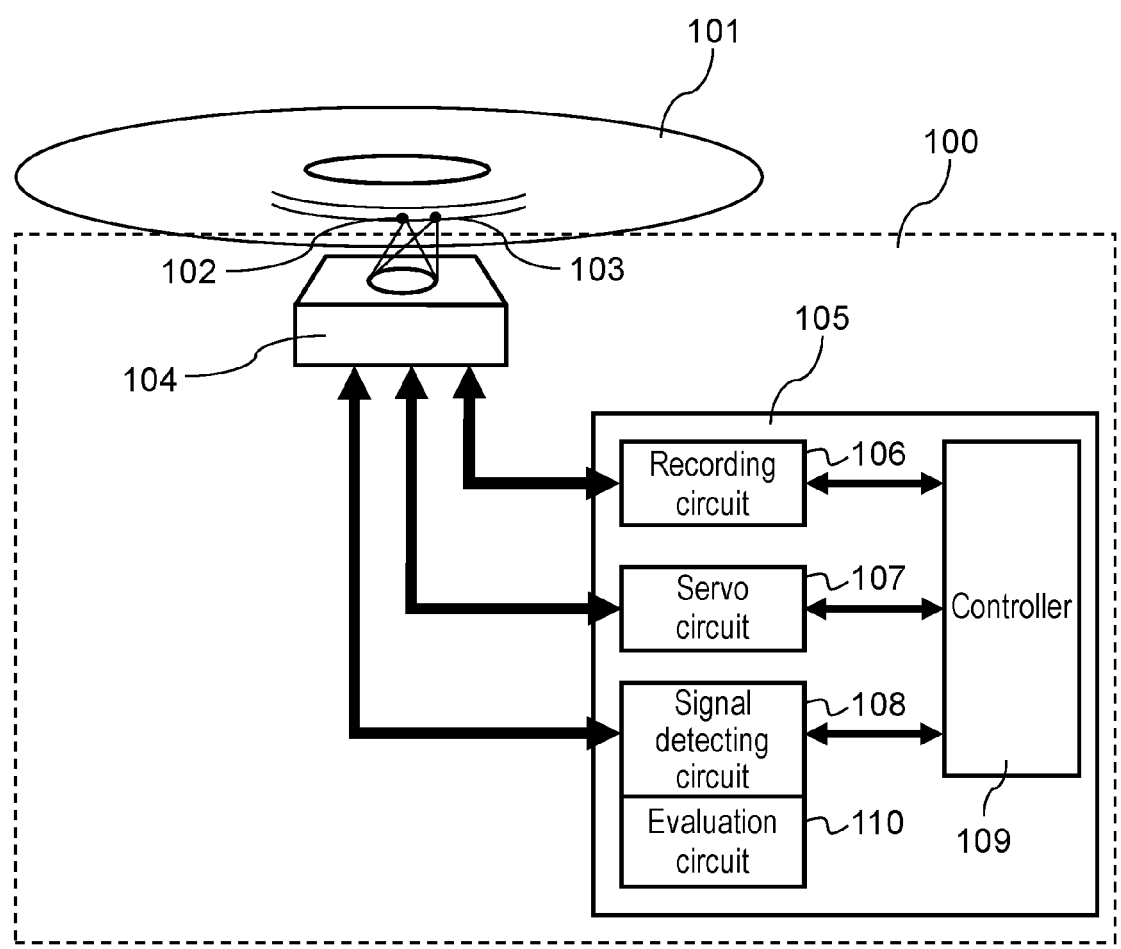
FIG. 1 is a block diagram of a recording and reproducing apparatus according to a first exemplary embodiment.

FIG. 1 is a block diagram of recording and reproducing apparatus 100 according to the first exemplary embodiment. In FIG. 1, recording and reproducing apparatus 100 includes optical pickup 104 which forms first optical spot 102 and second optical spot 103 on recording medium 101, and driving circuit 105. Driving circuit 105 includes recording circuit 106, servo circuit 107, signal detecting circuit 108 including evaluation circuit 110, and controller 109.

Figure 2:
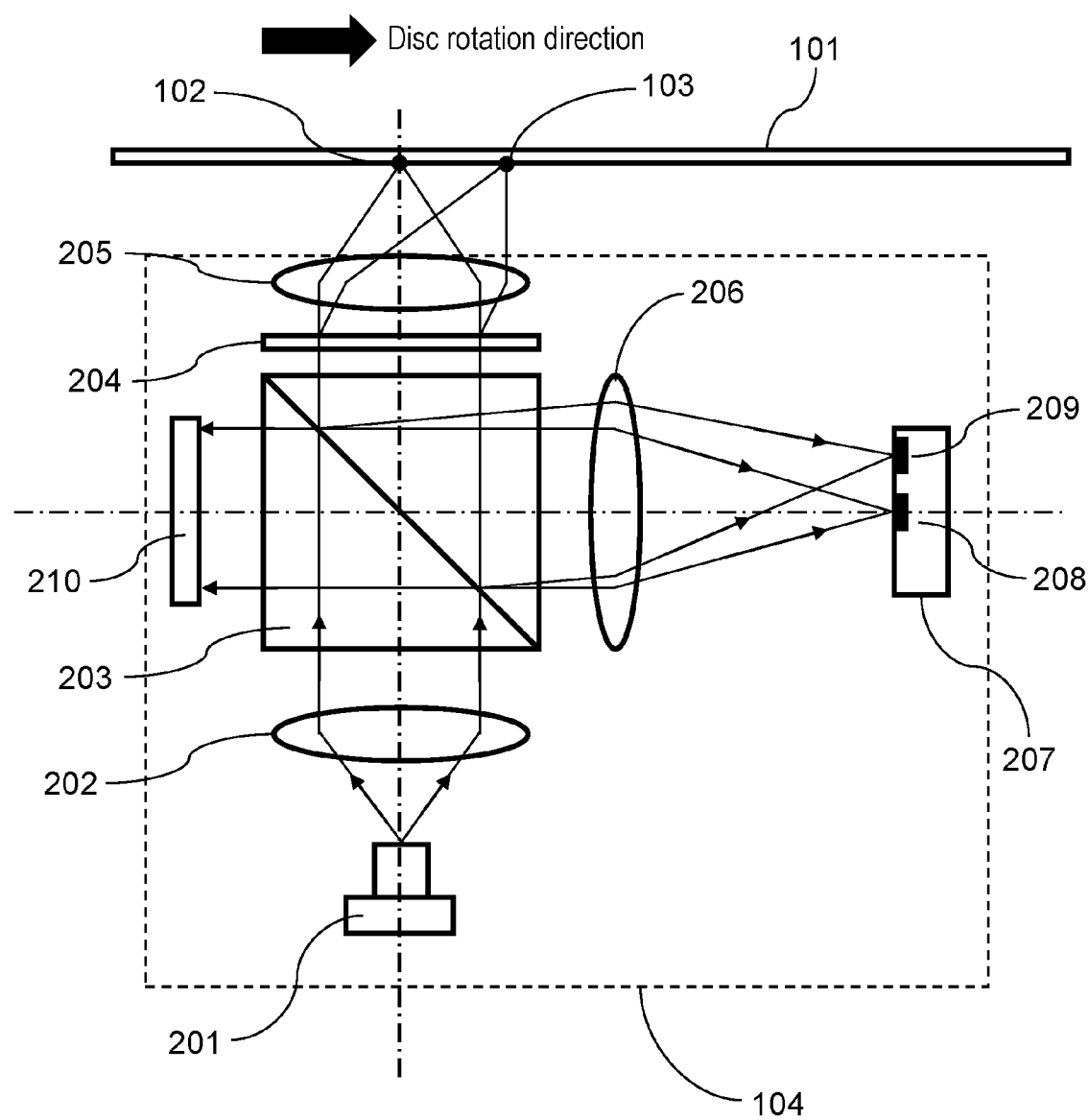
FIG. 2 is a view illustrating a configuration of an optical pickup according to the first exemplary embodiment.

FIG. 2 is a view illustrating a configuration of optical pickup 104 according to the first exemplary embodiment. In FIG. 2, optical pickup 104 forms first optical spot 102 and second optical spot 103 by using single light source 201. Optical pickup 104 includes light source 201, collimator lens 202, beam splitter 203, optical branching element 204 and objective lens 205. Further, optical pickup 104 includes detection lens 206, optical detector 207 and light amount detector 210.

A beam from light source 201 is converted into a parallel beam by collimator lens 202, the parallel beam is transmitted through beam splitter 203, optical branching element 204 and objective lens 205, and thereby forms first optical spot 102 on recording medium 101. At the same time, another beam divided by optical branching element 204 forms second optical spot 103.

The beam of first optical spot 102 reflected by recording medium 101 is transmitted through objective lens 205 and optical branching element 204, then is reflected by beam splitter 203, is transmitted through detection lens 206 and then is incident on first photodetector 208 on optical detector 207. Similarly, the beam of second optical spot 103 reflected by recording medium 101 is incident on second photodetector 209 on optical detector 207. In this regard, optical branching element 204 is, for example, a diffraction grating. Optical branching element 204 can divide beams at a predetermined light amount ratio.

Further, a part of beams from light source 201 is reflected by beam splitter 203, and is incident on light amount detector 210 which detects a light amount of light source 201.

Detection lens 206 is, for example, a cylindrical lens. Further, first photodetector 208 includes four divided light receiving regions. Each light receiving region generates a detection signal corresponding to a received light amount of beams reflected from recording medium 101. Optical pickup 104 generates a focusing error signal, a tracking error signal and the like based on each detection signal.

Returning to FIG. 1, driving circuit 105 includes recording circuit 106, servo circuit 107, signal detecting circuit 108, controller 109 and evaluation circuit 110. Recording circuit 106 drives light source 201 of optical pickup 104, and modulates the light amount of light source 201. Servo circuit 107 performs focus control and tracking control on optical pickup 104. Signal detecting circuit 108 detects an information signal of optical pickup 104. Controller 109 controls all of recording circuit 106, servo circuit 107 and signal detecting circuit 108. A focusing error signal and a tracking error signal from optical pickup 104 are input to driving circuit 105.

The focusing error signal is a signal indicating focus shift of optical pickup 104 on a recording surface of recording medium 101. Optical pickup 104 generates a focusing error signal from a detection signal of first photodetector 208 including the four divided light receiving region according to, for example, an astigmatic method.

Optical pickup 104 performs a focusing operation with respect to recording medium 101 based on a focusing error signal. The focusing error signal from optical pickup 104 is input to servo circuit 107. Servo circuit 107 generates a focus driving signal based on the focusing error signal. Optical pickup 104 performs the focusing operation with respect to recording medium 101 by driving an objective lens actuator of optical pickup 104 which is not illustrated, based on the focus driving signal generated by servo circuit 107. By performing focusing control on first optical spot 102, second optical spot 103 is also automatically focused on recording medium 101.

The tracking error signal is a signal indicating positional shift of an optical spot of optical pickup 104 on a track of recording medium 101. The positions of optical pickup 104 and recording medium 101 are relatively adjusted such that first optical spot 102 and second optical spot 103 are focused on the same track. Optical pickup 104 generates a tracking error signal from the detection signal of first photodetector 208 including the four divided light receiving regions according to, for example, a push-pull method.

Optical pickup 104 performs a tracking operation with respect to recording medium 101 based on a tracking error signal. The tracking error signal from optical pickup 104 is input to servo circuit 107. Servo circuit 107 generates a tracking driving signal based on the tracking error signal. Optical pickup 104 performs the tracking operation with respect to a predetermined track on recording medium 101 by driving the objective lens actuator of optical pickup 104, based on the tracking driving signal generated by servo circuit 107. By performing tracking control on first optical spot 102, second optical spot 103 is also automatically controlled on the same track.

Recording circuit 106 controls the light amount of light source 201 at a constant amount by using the detection signal from light amount detector 210. Further, for example, recording circuit 106 modulates light source 201 according to information which needs to be recorded.

Signal detecting circuit 108 generates an information signal corresponding to user data which is the information which needs to be recorded, and address information corresponding to a position of a track or a sector based on a detection signal from optical pickup 104.

Evaluation circuit 110 evaluates whether or not the information which needs to be recorded has been recorded on recording medium 101 by evaluating the detection signal from optical pickup 104.

Controller 109 appropriately performs the focusing operation and the tracking operation by controlling servo circuit 107, and causes optical pickup 104 to seek a predetermined track based on address information from signal detecting circuit 108, and records information in the predetermined track or reproduces information from the predetermined track by controlling recording circuit 106.

In FIG. 2, information is recorded by first optical spot 102 which precedes in a rotation direction of recording medium 101, and the information is reproduced by following second optical spot 103 immediately after recording and is evaluated recording quality.

Figure 3:
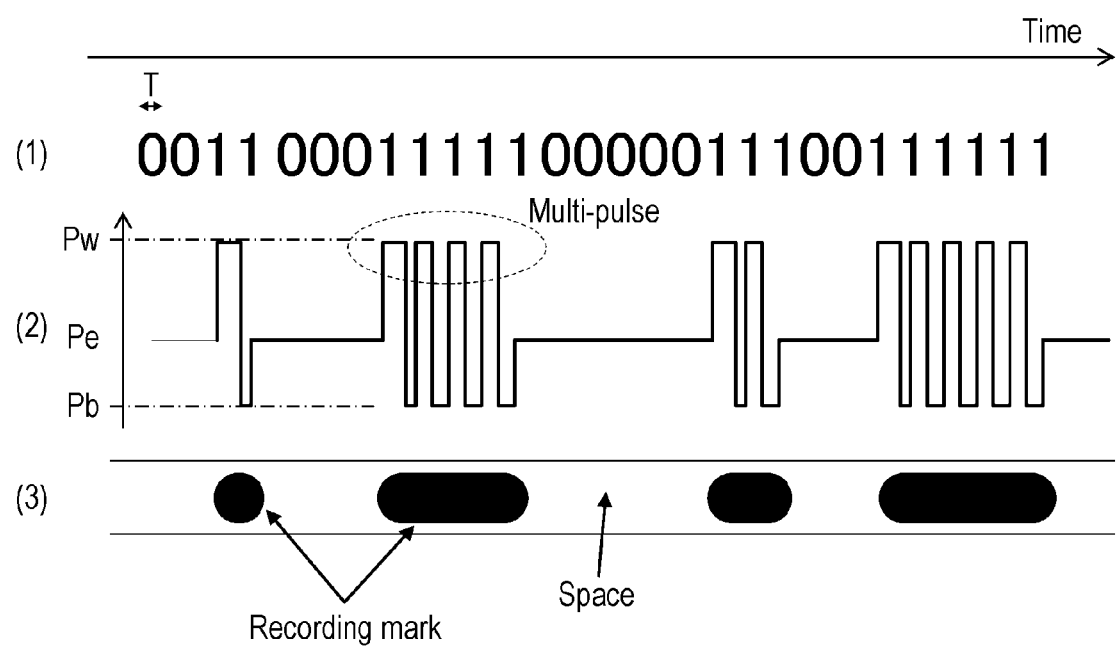
FIG. 3 is a view for explaining a recording modulated waveform of a light source when recording on a recording medium.

FIG. 3 is a view for explaining a recording modulated waveform of light source 201 when recording on recording medium 101. FIG. 3 illustrates recording medium 101 as a rewritable BD, and a simplified recording modulated waveform. In FIG. 3, a horizontal axis indicates a time.

In FIG. 3, signal (1) is a signal according to a 1-7PP modulating method for recording, and a signal after Non Return to Zero Inverting (NRZI) conversion. Waveform (2) is a modulated waveform of light source 201 corresponding to signal (1). Recording state (3) indicates recording marks recorded on a track of recording medium 101.

In waveform (2), a vertical axis indicates a light amount (light level) of beams to be irradiated on recording medium 101 by light source 201 of optical pickup 104. A modulated waveform of light source 201 is controlled at three light levels Pw, Pe and Pb.

More specifically, a portion of signal (1) at which a signal is 0 is irradiated at light level Pe. Light level Pe is a light level at which information having been already recorded on recording medium 101 is erased. Each portion of recording medium 101 irradiated at light level Pe is a space without a recording mark as shown in recording state (3). Portions of signal (1) at which signals are 1 are irradiated with a multi-pulse at light level Pw and light level Pb, and the irradiated portions are recording marks in recording state (3).

There is also a method for irradiating at light level Pw without using a multi-pulse when recording marks. However, when irradiating at light level Pw, a recording start portion of a mark is insufficiently heated, and a recording end portion of a mark is overheated due to heat propagation. Therefore, each recording mark is teardrop-shaped that the recording start portion is thin and gradually becomes bolder toward the recording end portion, and it is difficult to create good recording marks.

Hence, to realize a uniform recording mark width from the recording start portion to the recording end portion as in recording state (3), it is desirable to use a multi-pulse having waveform (2).

In addition, upon actual recording in a rewritable BD, a more complex multi-pulse than a multi-pulse of waveform (2) is controlled. However, this control is simplified without influencing description of the present exemplary embodiment.

When first optical spot 102 records information by using a multi-pulse, second optical spot 103 which reproduces this information also shares light source 201, and therefore is modulated by a multi-pulse. Hence, a multi-pulse waveform is superimposed on a reproducing signal from second optical spot 103. This superimposed multi-pulse waveform is disturbance or noise for a reproducing signal. Hence, to reproduce accurate information, it is necessary to remove a multi-pulse waveform from a reproducing signal.

One method for removing a multi-pulse from a reproducing signal is removing a multi-pulse by performing a differential or division on a reproducing signal by using a multi-pulse waveform output from light amount detector 210. And various methods have been proposed. However, each method has a following problem.

In the case of a rewritable BD, when recording is performed at a standard double speed, a multi-pulse frequency is 132 MHz. This multi-pulse frequency is high, and therefore the multi-pulse waveform is distorted in the reproducing signal of second optical spot 103. Causes of the distortion more specifically include frequency characteristics of second photodetector 209, frequency characteristics or a through rate of a head amplifier circuit which is usually integrated in optical detector 207 and is not illustrated, and an influence of impedance caused by a wiring from optical pickup 104 to driving circuit 105.

Further, for example, a waveform is distorted in a multi-pulse, too, included in a signal which is used to cancel the superimposed multi-pulse and received from light amount detector 210. However, a distortion amount differs depending on a difference in or an individual variation of a light receiving element, a head amplifier circuit or a wiring. Therefore, even when a differential or division is performed, it is difficult to completely remove the superimposed multi-pulse, and a residual is produced.

Signal components including, for example, 2T marks and spaces in a reproducing signal from second optical spot 103 are very little. In this regard, T is a channel clock, and has a length of single 0 or 1 of signal (1) in FIG. 3. Hence, even a little residual of the superimposed multi-pulse influences a reproducing signal. Therefore, there is a big problem that it is difficult to accurately evaluate reproducing signal quality.

Figure 4:
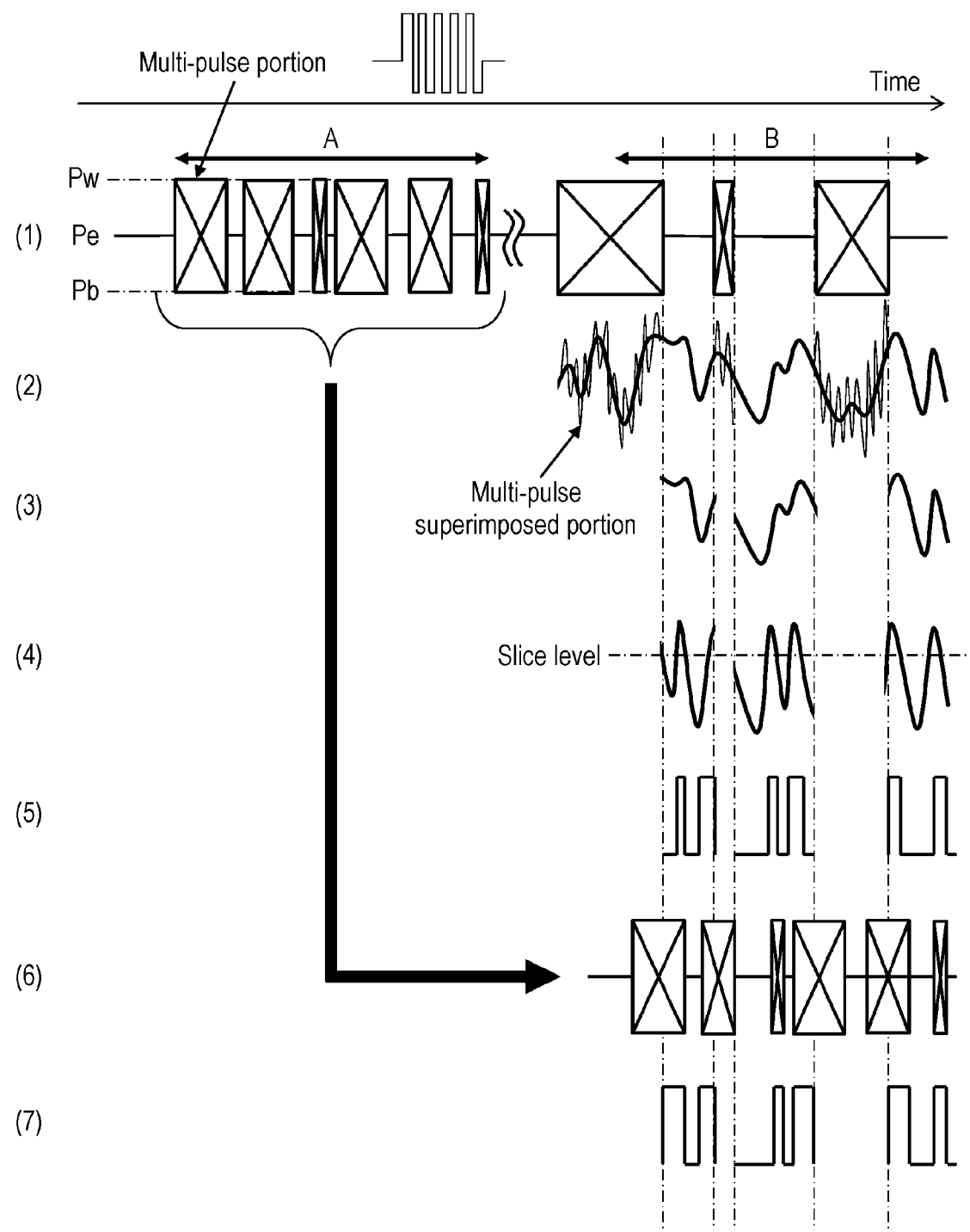
FIG. 4 is a view for explaining evaluation using a reproducing signal according to the first exemplary embodiment.

FIG. 4 is a view for explaining evaluation using a reproducing signal according to the present exemplary embodiment. In FIG. 4, a horizontal axis indicates a time. FIG. 4 illustrates a simplified waveform of a multi-pulse portion.

In FIG. 4 signal (1) is a modulated waveform of light source 201 for recording. When first optical spot 102 records in a period of portion A, a period in which second optical spot 103 scans recorded marks and spaces is portion B. When second optical spot 103 scans in the period of portion B, as indicated in the period of portion B, light source 201 is modulated according to a modulation pattern completely different from a modulation pattern in the period of portion A.

Signal (2) indicates a reproducing signal reproduced by second optical spot 103 in a state where a waveform of light source 201 is modulated in the period of portion B. Fine modulation components of a waveform schematically indicate a superimposed multi-pulse portion.

Signal (3) indicates a waveform extracted by a gate circuit which is not illustrated only in a period in which light source 201 emits beams at constant light level Pe. In this period, light source 201 emits beams at constant light level Pe, and a multi-pulse is not included in a reproducing signal from second optical spot 103. That is, it is found that the reproducing signal in this period can avoid an influence of the superimposed multi-pulse portion.

Signal (4) indicates a waveform obtained by forming a waveform of signal (3) by an equalizing circuit which is not illustrated.

Further, signal (5) indicates a waveform obtained by binarizing the waveform of signal (4) at a slice level. These types of waveform processing are performed by signal detecting circuit 108.

In the case of a rewritable BD, 1 and 0 appear with approximately the same frequency when a data length is sufficiently long, i.e., a data length is about 2000T. Hence, evaluation circuit 110 counts numbers of times of appearances of 0 and 1 in waveforms of signal (5) per channel clock T, and evaluates recording quality of first optical spot 102 based on a ratio of 0 and 1. According to this evaluation, a waveform portion including a multi-pulse is removed.

Consequently, it is possible to perform good recording quality evaluation without an influence of waveform distortion due to the multi-pulse.

Signal (6) indicates an optically modulated waveform in an period of portion A corresponding to a waveform which originally needs to be reproduced in the period of portion B.

Signal (7) indicates a waveform obtained by extracting data corresponding to the modulated waveform in the period of portion A, only in the period in which light source 201 emits beams at constant light amount Pe. Ideally, signal (5) and signal (7) have the completely same waveform. Consequently, by comparing these two waveforms, it is possible to evaluate recording quality of first optical spot 102. FIG. 4 intentionally illustrates a portion at which two waveforms match and a portion at which the two waveforms do not match.

For example, evaluation circuit 110 counts whether or not the waveform of signal (5) and a waveform of signal (7) match and do not match per channel clock T, and determines a ratio of mismatch as a recording quality index. Further, evaluation circuit 110 can also generate a differential signal between signal (5) and signal (7), integrate this differential signal in a predetermined period and determine this integration value as a recording quality index. Ideally, the waveform of signal (5) and the waveform of signal (7) match, and therefore the differential signal is 0 and the integration value is also 0. Thus, even when the waveform of signal (5) and the waveform of signal (7) are compared, a waveform portion including a multi-pulse is removed. Consequently, it is possible to perform good recording quality evaluation without an influence of waveform distortion due to the multi-pulse.

[1-3. Effect and Others]

As described above, in the present exemplary embodiment, recording and reproducing apparatus 100 includes light source 201, an optical system configured to divide a beam from light source 201, and to form first optical spot 102 and second optical spot 103 on recording medium 101, recording circuit 106 configured to drive light source 201 and to modulate a light amount of light source 201, and further to record the information on recording medium 101 by the first optical spot 102 by modulating the light amount of light source 201 based on information, and evaluation circuit 110 configured to evaluate the information recorded on recording medium 101 by reproducing by the second optical spot 103 in a period in which recording circuit 106 causes light source 201 to emit beams at a constant light amount.

Further, evaluation circuit 110 evaluates by comparing first data with second data, the first data is generated based on a reproducing signal by reproducing the information recorded on recording medium 101 by the second optical spot 103 in the period, the second data is generated based on source information, which is recorded on the recording medium 101, corresponding to the information reproduced by second optical spot 103 in the period.

Thus, for reproduction evaluation of second optical spot 103, it is possible to realize good recording quality evaluation without an influence of waveform distortion due to a multi-pulse.

(Second Exemplary Embodiment)

Next, the second exemplary embodiment will be described with reference to FIGS. 5 to 10.

[2-1. Configuration]

In a system of a high recording density such as a rewritable BD, a short recording mark is close to a limitation of an optical resolution. Therefore, a sufficient signal amplitude cannot be obtained, and influences such as an intersymbol interference and a crosstalk are significant. In this regard, signal processing of equalizing and binarization has difficulty in ensuring sufficient signal quality, and therefore Partial Response Maximum likelihood (PRML) signal processing is used. Hence, it is desirable to evaluate reproducing recorded information by using the PRML signal processing when even DRAW is performed by second optical spot 103. However, a reproducing signal whose the superimposed multi-pulse portion of signal (3) in FIG. 4 described in the first exemplary embodiment has been removed is chopped and discontinuous. Therefore, it is difficult to perform the PRML signal processing.

Hence, in the present exemplary embodiment, a period which is the entirety or part of a period in which the recording circuit causes the light source to emit beams at a constant light amount is a first period, a period other than the first period in the period in which the recording circuit causes the light source to emit beams is a second period, a first reproducing waveform is a waveform generated by reproducing information recorded on the recording medium by the second optical spot in the first period, and a second reproducing waveform is a waveform generated based on source information corresponding to the information reproduced by the second optical spot in the second period and recorded by the recording circuit at a position on the recording medium at which the information is reproduced in the second period by the second optical spot. The evaluation circuit evaluates reproducing information based on an arithmetic operation result of the first reproducing waveform and the second reproducing waveform.

Figure 5:
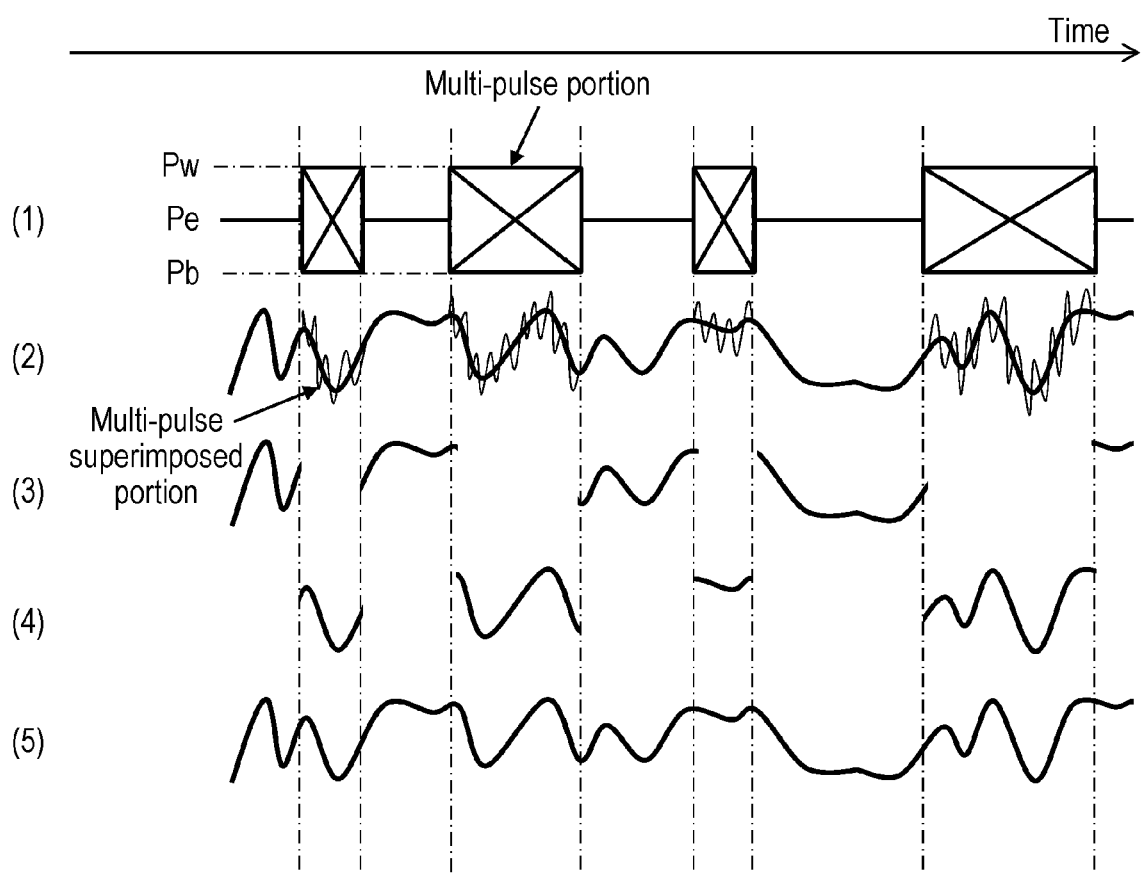
FIG. 5 is a view for explaining evaluation using a reproducing signal according to a second exemplary embodiment.

FIG. 5 is a view for explaining evaluation using a reproducing signal according to the present exemplary embodiment. In FIG. 5, a horizontal axis indicates a time. FIG. 5 illustrates a simplified waveform of a multi-pulse portion.

In FIG. 5, signal (1) indicates a modulated waveform of light source 201 when second optical spot 103 performs a reproducing operation. Signal (2) indicates a reproducing waveform from second optical spot 103 in a state where a waveform of light source 201 is modulated. Signal (2) includes a superimposed multi-pulse portion on which a multi-pulse which is disturbance is superimposed. Signal (3) indicates a waveform extracted by a gate circuit which is not illustrated only in a period in which light source 201 emits beams at constant light level Pe, and indicates a first reproducing waveform from which the superimposed multi-pulse portion is removed.

Signal (4) indicates a second reproducing waveform which is predicted to be reproduced in the superimposed multi-pulse portion. According to DRAW, a signal reproduced by second optical spot 103 is a signal recorded by first optical spot 102 immediately before. Consequently, it is possible to specify source data which is predicted to be reproduced by second optical spot 103. By simulating a Modulation Transfer function (MTF) resulting from optical reproduction and frequency characteristics of second photodetector 209, a head amplifier circuit which is not illustrated and a wiring, and performing an arithmetic operation for this source data, it is possible to obtain a prediction waveform which is predicted to be reproduced by second optical spot 103. A waveform portion, obtained by extracting from this prediction waveform, corresponding to the superimposed multi-pulse portion of signal (1) is a second reproducing waveform of signal (4).

Signal (5) is a signal obtained by synthesizing signal (3) and signal (4). Signal (5) is a continuous reproducing waveform without a multi-pulse superimposed which includes a portion which is a superimposed multi-pulse portion in signal (2).

For signal (5), evaluation according to PRML signal processing performed by evaluation circuit 110 and error rate evaluation can be performed and substantially the same signal evaluation as normal signal reproduced by first optical spot 102 can be performed. Consequently, it is possible to realize recording quality evaluation of a higher standard which is adapted to normal reproducing.

Figure 6:
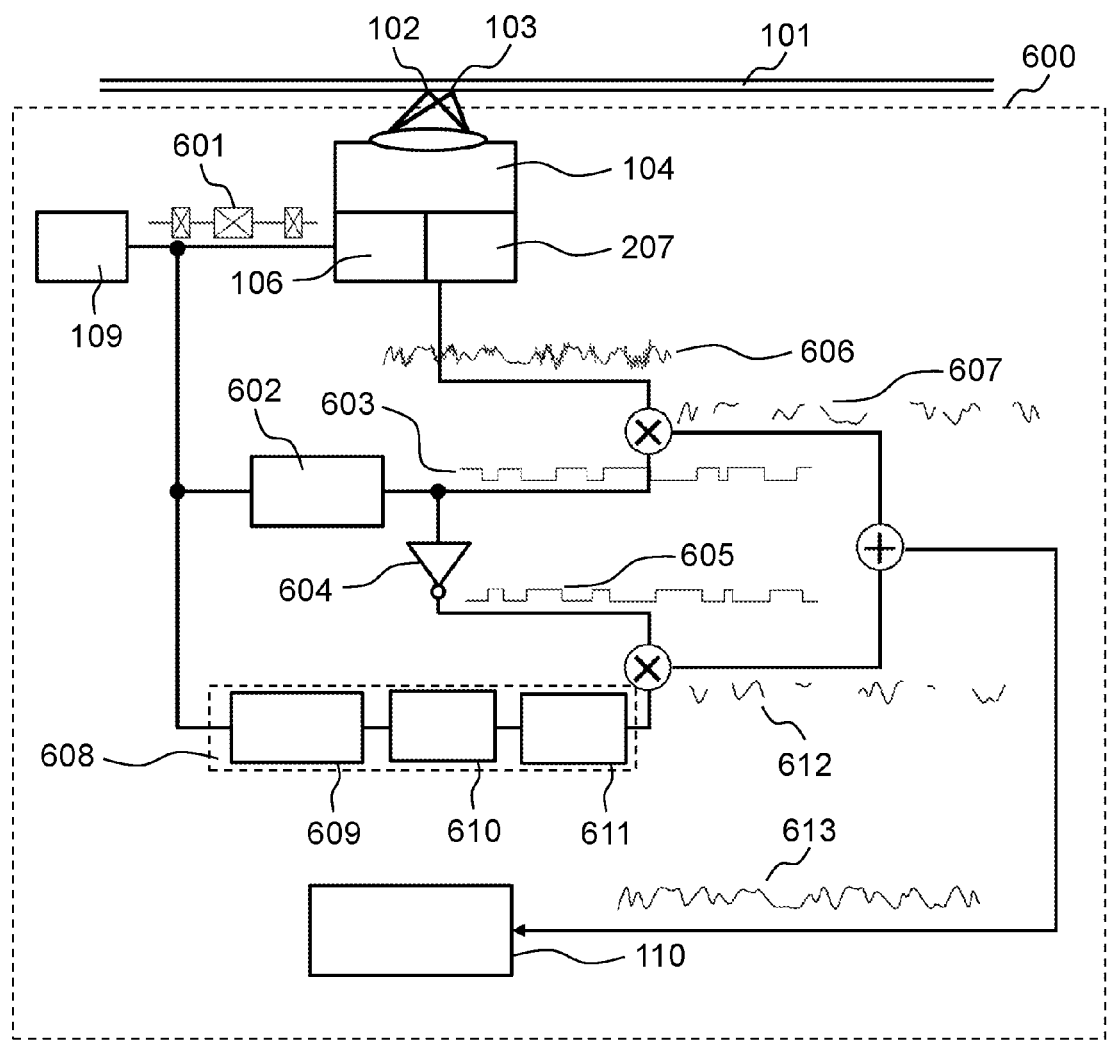
FIG. 6 is a view illustrating a configuration of a recording and reproducing apparatus according to the second exemplary embodiment.

FIG. 6 is a view illustrating a configuration of recording and reproducing apparatus 600 according to the present exemplary embodiment. Modulated signal 601 including a multi-pulse is sent from controller 109 to recording circuit 106. In the present exemplary embodiment, a case where modulated signal 601 including a multi-pulse from controller 109 is output will be described. Modulated signal 601 corresponds to signal (1) in FIG. 5.

In addition, source data to be recorded may be output from controller 109, and recording circuit 106 may generate modulated signal 601 from this source data.

Modulated signal 601 is input to gate circuit 602 used to remove a superimposed multi-pulse portion. Gate circuit 602 outputs gate signal 603 for removing a multi-pulse portion from reproducing waveform 606 from second optical spot 103. Reproducing waveform 606 corresponds to signal (2) in FIG. 5.

An arithmetic operation is performed by using reproducing waveform 606 and gate signal 603. More specifically, when gate signal 603 is at a high level, reproducing waveform 606 is output, and, when gate signal 603 is at a low level, nothing is output. By performing an arithmetic operation in this way, it is possible to obtain first reproducing waveform 607 in which the multi-pulse is removed. First reproducing waveform 607 corresponds to signal (3) in FIG. 5.

Further, by inputting gate signal 603 to inverter 604, it is possible to obtain gate signal 605 for extracting only a superimposed multi-pulse portion.

Meanwhile, modulated signal 601 is input to waveform correction circuit 608. In this regard, waveform correction circuit 608 includes frequency characteristics correction circuit 609, delay circuit 610 and gain circuit 611. Frequency characteristics correction circuit 609 corrects, for example, an optical MTF and a frequency characteristic of a circuit. Delay circuit 610 delays a signal by a time at which data recorded by first optical spot 102 reaches second optical spot 103. Gain circuit 611 adjusts an amplitude and an offset between the generated waveform and first reproducing waveform 607.

An arithmetic operation is performed on an output of waveform correction circuit 608 and gate signal 605. More specifically, when gate signal 605 is at a high level, the output of waveform correction circuit 608 is output, and, when gate signal 605 is at a low level, nothing is output. By performing an arithmetic operation in this way, it is possible to obtain second reproducing waveform 612 whose portion corresponding to a superimposed multi-pulse portion. Second reproducing waveform 612 corresponds to signal (4) in FIG. 5.

Further, by synthesizing first reproducing waveform 607 and second reproducing waveform 612, it is possible to obtain continuous waveform for evaluation 613. Waveform for evaluation 613 is input to evaluation circuit 110 which performs, for example, PRML signal processing or error rate evaluation. Evaluation circuit 110 evaluates a reproducing signal from second optical spot 103. Consequently, it is possible to realize good recording quality evaluation which is nearly equal to normal evaluation for the signal reproduced by first optical spot 102.

In addition, FIG. 6 illustrates a sequence of signal processing by using analog waveforms. However, for example, after reproducing waveform 606 is A-D converted, the same signal processing may be performed on a digital signal.

Further, in the present exemplary embodiment, when first reproducing waveform 607 and second reproducing waveform 612 are synthesized, it is desirable to reduce errors in a time axis direction and an amplitude direction.

An offset amount between first reproducing waveform 607 and second reproducing waveform 612 in the time axis direction is determined based on an optical spot spacing between first optical spot 102 and second optical spot 103 on recording medium 101, and a linear velocity of recording medium 101. For example, if the optical spot spacing is 10 μm, and the linear velocity is 10 m/sec, a time offset between first reproducing waveform 607 and second reproducing waveform 612 is 1 μsec. Hence, if delay circuit 610 delays second reproducing waveform 612 1 μsec, it is possible to synthesize first reproducing waveform 607 and second reproducing waveform 612 without an offset. Actually, it is desirable to take into account not only a delay amount deriving from an optical spot spacing between optical spots but also a delay amount generated in each route of signal processing until first reproducing waveform 607 and second reproducing waveform 612 are synthesized.

Figure 7:
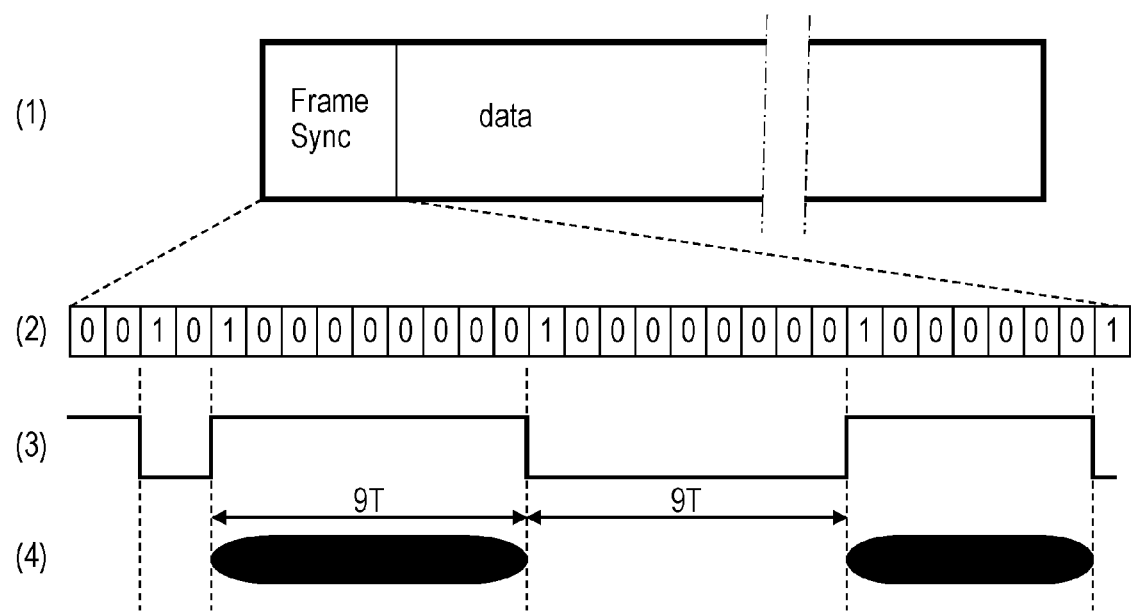
FIG. 7 is a view illustrating a structure of a recording frame of a Blu-ray (registered trademark) disc (BD) according to the second exemplary embodiment.

In this regard, when an error occurs in an optical spot spacing between optical spots or a linear velocity, an error is generated in a time offset, too. A method for using, for example, Sync portion included in recording data will be described as a method for reducing this error. FIG. 7 is a view illustrating a recording frame structure of a BD which is an example of a recording medium. In FIG. 7, recording frame (1) includes a Frame Sync portion of 30 channel bits at a head portion, and a subsequent data portion. Bit string (2) indicates a bit string of the Frame Sync portion. Waveform (3) indicates a recording waveform which is NRZI converted from bit string (2). Recording state (4) indicates marks and spaces recorded on recording medium 101. As illustrated in FIG. 7, 9T marks and spaces are always included in the frame Sync portion at a head of the recording frame. Hence, by using the 9T signal, it is possible to accurately calculate an offset amount between first reproducing waveform 607 and second reproducing waveform 612. More specifically, a time is measured from a moment when first optical spot 102 starts recording a 9T signal, to a time when second optical spot 103 starts reproducing the 9T signal, and delay circuit 610 delays this measured time. In the above example, it is known that, after 1 μsec that first optical spot 102 starts recording a 9T signal, second optical spot 103 reproduces the 9T signal. Consequently, it is possible to detect a 9T signal from a reproducing signal of second optical spot 103. A 9T signal may be detected from first reproducing waveform 607 or may be detected from reproducing waveform 606 in which the superimposed multi-pulse portion is not removed. The 9T signal has a great signal amplitude, and therefore it is possible to detect even the 9T signal including the superimposed multi-pulse portion. However, the superimposed multi-pulse components may be removed by passing an Low Pass Filter (LPF) which is not illustrated to reproducing waveform 606. A frequency of the superimposed multi-pulse component is 132 MHz and a frequency of the 9T signal is about 7.3 MHz. Consequently, it is possible to easily remove the superimposed multi-pulse components by using the LPF. Alternatively, by dividing reproducing waveform 606 by a signal of light amount detector 210, the superimposed multi-pulse components may be canceled to some degree. Upon synthesizing first reproducing waveform 607 and second reproducing waveform 612, by correcting a waveform offset in the time axis direction as described above, it is possible to improve accuracy of synthesizing waveforms, and more precisely perform recording quality evaluation.

When first reproducing waveform 607 and second reproducing waveform 612 are synthesized, it is desirable to appropriately set gain circuit 611 to set a small error in the amplitude direction. As one method for simply adjusting an amplitude, there is a method for causing an average signal level of first reproducing waveform 607 and an average signal level of second reproducing waveform 612 to meet. The average level of first reproducing waveform 607 can be easily obtained by passing the LPF which is not illustrated to first reproducing waveform 607 or reproducing waveform 606. Similarly, the average level of second reproducing waveform 612 can be also easily obtained by passing the LPF which is not illustrated to second reproducing waveform 612 or an output waveform of waveform correction circuit 608. Further, second reproducing waveform 612 is generated by performing an arithmetic operation in waveform correction circuit 608. Consequently, it is possible to calculate the average level of second reproducing waveform 612, too, by performing an arithmetic operation.

By configuring gain circuit 611 such that the average level of first reproducing waveform 607 is roughly equal to the average level of second reproducing waveform 612, it is possible to adjust amplitude between first reproducing waveform 607 and second reproducing waveform 612, and to synthesize reproducing waveform 607 and second reproducing waveform 612.

Further, as a method for causing the amplitude to precisely match, there is a method for using the 9T signal included in the Frame Sync portion. Similar to the above method that an offset amount between first reproducing waveform 607 and second reproducing waveform 612 is detected, it is possible to extract the 9T signal included in first reproducing waveform 607. Further, it is possible to easily extract the 9T signal included in second reproducing waveform 612, too, based on an output of frequency characteristics correction circuit 609. By setting a gain and an offset of gain circuit 611 such that amplitudes of these two 9T signals are equal, it is possible to reduce an error in the amplitude direction in synthesizing first reproducing waveform 607 and second reproducing waveform 612, and more precisely perform recording quality evaluation.

Further, when an amplitude and an offset are adjusted in synthesizing waveforms by using the 9T signal included in the Frame Sync portion, the following problem occurs in some cases.

Figure 8:
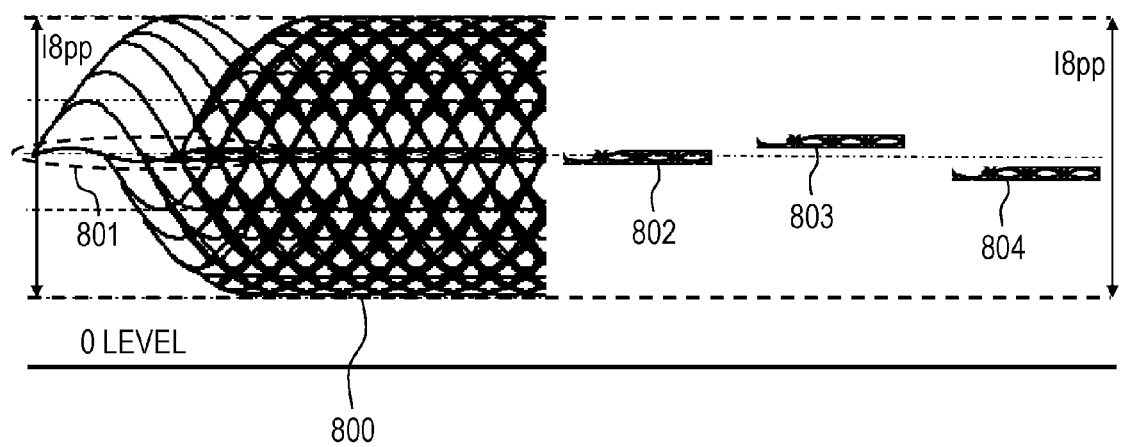
FIG. 8 is a schematic view of a reproducing waveform according to the second exemplary embodiment.

FIG. 8 is a view schematically illustrating a reproducing waveform. In FIG. 8, waveform 800 is an example of an output waveform of waveform correction circuit 608 or a waveform of second reproducing waveform 612. Waveform 800 is generally called an eye pattern and is corresponds to a waveform of the data portion of recording frame (1) illustrated in FIG. 7. Waveform 800 is obtained by overlaying waveforms when various combination patterns of marks and spaces having lengths from 2T to 8T are reproduced. 2T waveform 801 of waveform 800 indicated by broken line portions is a waveform corresponding to a repetition pattern of 2T marks and spaces that amplitude of a reproducing waveform is the smallest. The greatest amplitude I8pp indicates an 8T waveform which is a reproducing waveform of a repetition of 8T marks and spaces.

In addition, the reproducing waveform of the 9T signal included in the Frame Sync portion has a little greater amplitude than I8pp and the reproducing waveform of the 9T signal occurs at a low frequency and cannot be normally observed as the eye pattern, and therefore is not illustrated in FIG. 8.

Waveforms 802, 803 and 804 are waveform examples of first reproducing waveform 607. FIG. 8 illustrates waveforms 802, 803 and 804 as only 2T waveforms obtained when a repetition pattern of 2T marks and spaces is reproduced, and does not illustrate reproducing waveforms of repetition patterns of other lengths for viewability.

By using the 9T signal included in the Frame Sync portion, an amplitude and an offset of waveform 800 are adjusted by gain circuit 611. As a result, the amplitude and the offset of I8pp of the 8T waveform of first reproducing waveform 607 substantially are equal to the amplitude and the offset of waveform 800. However, focusing on the 2T waveform of first reproducing waveform 607, offset positions of waveforms 802, 803 and 804 are different as illustrated in FIG. 8. This difference in the offset positions derives from a difference in recorded mark sizes due to a difference in recording power upon recording.

Normally, test of recording is performed before user data is recorded, and recording power calibration for determining optimal recording power is performed. However, due to a calibration error upon the recording power calibration or a dirt difference which differs depending on a position on a recording medium, recording is performed with power different from optimal power. When the recording power differs from the optimal power, sizes of marks to be recorded, i.e., mainly lengths of the marks are long or short compared to a state where lengths of marks and spaces of optimal mark lengths, i.e., generally, lengths of marks and spaces of same data lengths are nearly equal.

Waveform 802 is a waveform obtained when marks and spaces recorded with the optimal recording power are reproduced. An offset position of the 2T waveform included in waveform 802 is substantially equal to an offset position of 2T waveform 801.

By contrast with this, when recording power is smaller than the optimal power, marks of waveform 803 are shorter than the optimal mark length. Hence, the 2T waveform included in waveform 803 is offset upward compared to 2T waveform 801.

To the contrary, when recording power is larger than the optimal power, marks of waveform 804 are longer than the optimal mark length. Hence, the 2T waveform included in waveform 804 is offset downward compared to 2T waveform 801.

When such waveform 803 or waveform 804 is synthesized with waveform 800, unevenness is generated in the 2T signal at a waveform joint portion, and therefore it is not possible to obtain a smooth and continuous waveform. When evaluation circuit 110 evaluates this waveform, an error is generated in an evaluation result due to unevenness in the 2T waveform.

Figure 9:
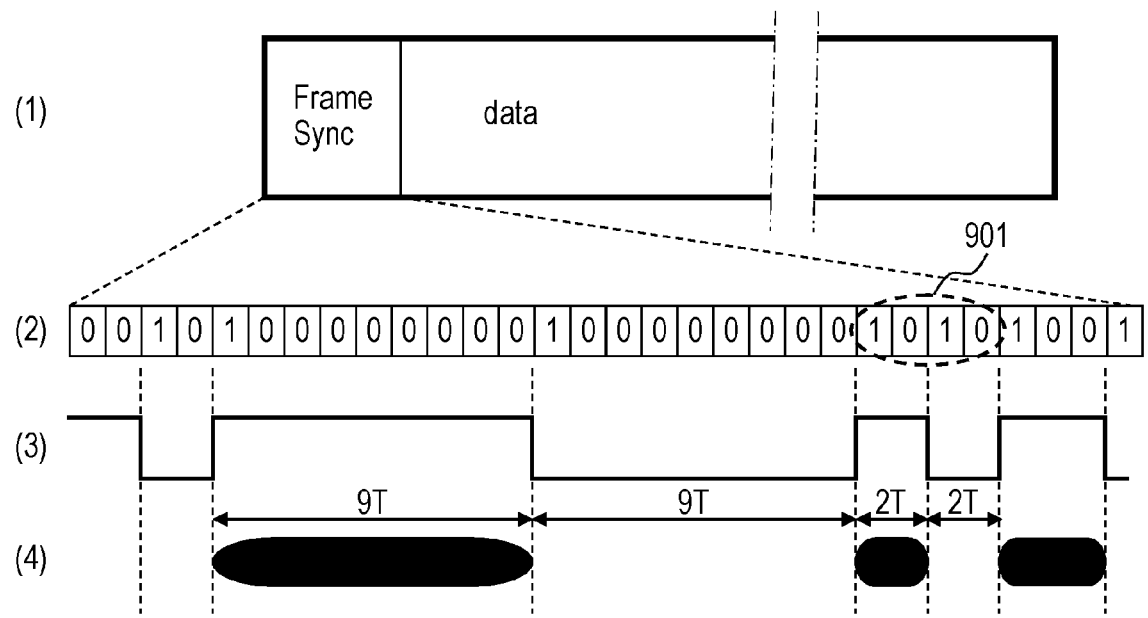
FIG. 9 is a view illustrating another structure of a recording frame of a BD according to the second exemplary embodiment.

A method for reducing this problem will be described with reference to FIG. 9. FIG. 9 is another view illustrating a recording frame structure of a BD. In FIG. 9, in a head Frame Sync portion of recording frame (1), as indicated by bit string (2), a bit string corresponding to 2T marks and spaces indicated by broken line portion 901 is provided next to a bit string corresponding to 9T marks and spaces. Waveform (3) indicates a recording waveform which is NRZI converted from a bit string. Recording state (4) indicates marks and spaces recorded on recording medium 101. When this Frame Sync portion is used, it is possible to extract the 9T signal and the 2T signal from an output waveform of waveform correction circuit 608 and reproducing waveform 606. Consequently, gain circuit 611 can adjust an offset such that 2T signal levels of first reproducing waveform 607 is equal to second reproducing waveform 612 upon synthesizing waveforms.

Thus, it is possible to smoothly synthesize first reproducing waveform 607 and second reproducing waveform 612 based on the output waveform of waveform correction circuit 608 without generating unevenness in the 2T signal at a waveform joint portion. Consequently, evaluation circuit 110 can perform good recording quality evaluation without generating an evaluation error caused by unevenness in the 2T signal.

When an offset of reproducing waveforms having a recording power error is adjusted by using the 2T signal, an offset of 8T signals does not slightly match. However, marks and spaces of the 8T signals longer than those of the 2T signals are influenced a little by this difference in the offset. Consequently, by causing an offset of shorter marks and spaces of the 2T signals to match, it is possible to perform good evaluation. An offset level of the 2T signals can be simply determined by using an average level of marks and spaces of these signals.

Further, in addition to a method for causing offsets of 2T signals to match, offsets may be adjusted to such a level that offsets of 2T signals and 9T signals decrease to some degree, respectively.

In addition, the 9T signals and the 2T signals have been used as an example of the Frame Sync portion. However, the Frame Sync portion is not limited to these signals, and may be a combination of 8T signals and 3T signals, for example. Further, by providing three or more types of signals in the Frame Sync portion instead of two types and using amplitudes and offsets of these signals, it is also possible to determine the amplitudes and the offsets at an appropriate rate upon synthesizing waveforms.

Furthermore, for example, as to an order of the 9T signal and the 2T signal in the Frame Sync portion, which either the 9T signal or the 2T signal may be disposed forward in principle. However, the 2T signal has a low amplitude and the 9T signal has marks and spaces of a longer data length, has a high amplitude and can be easily detected. Therefore it is desirably that the 9T signal is disposed forward.

Figure 10:
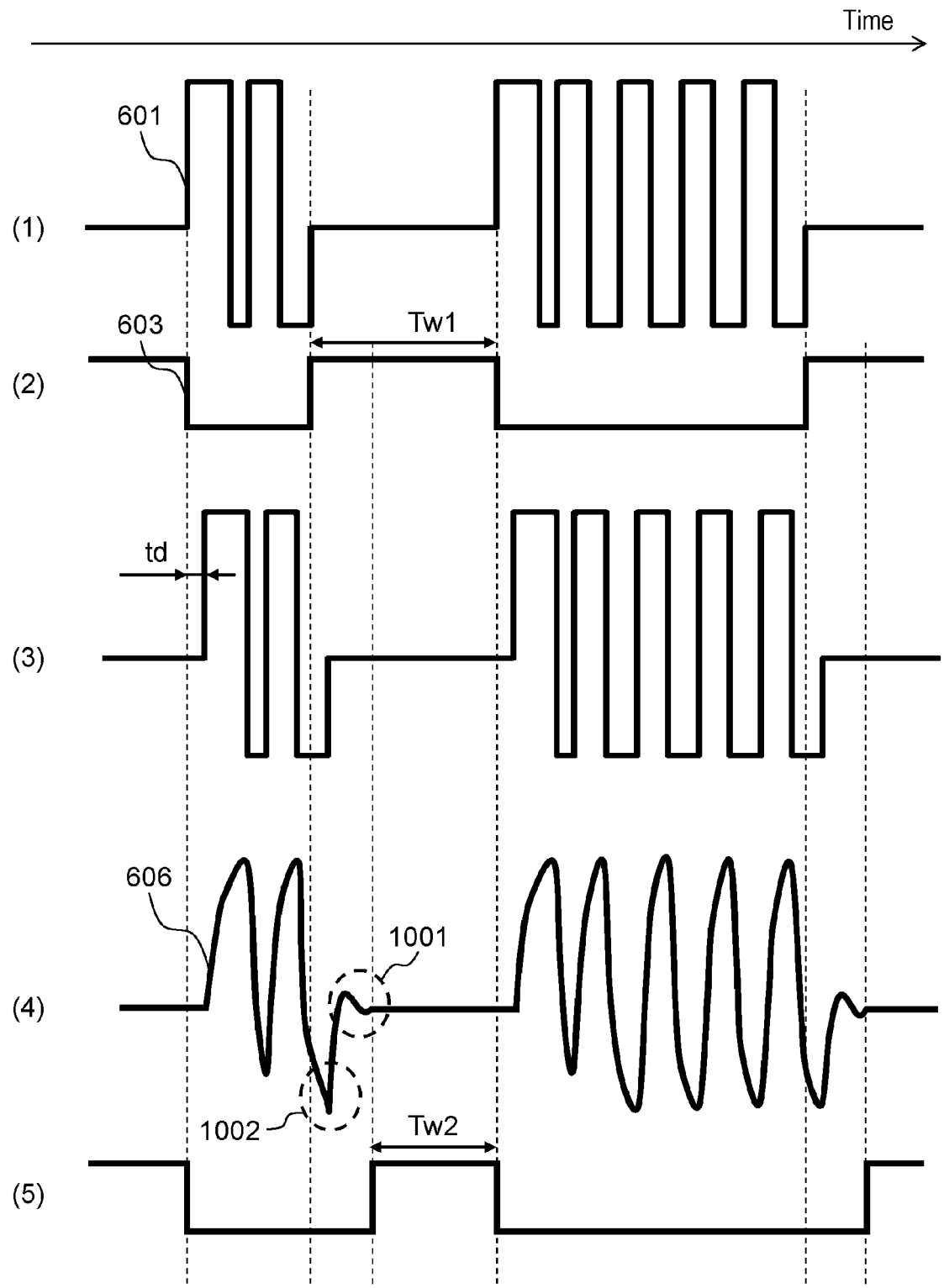
FIG. 10 is a view for explaining a gate signal according to the second exemplary embodiment.

Next, generating gate signal 603 to obtain first reproducing waveform 607 will be described in detail. FIG. 10 is a view for explaining gate signal 603 for obtaining first reproducing waveform 607. In FIG. 10, a horizontal axis indicates a time.

In FIG. 10, signal (1) indicates modulated signal 601 which is input from controller 109 to recording circuit 106 and includes a multi-pulse. Signal (2) indicates gate signal 603 which is generated by gate circuit 602 and corresponds to a portion of modulated signal 601 at which light source 201 is caused to emit beams at a constant light amount. A signal of gate time Tw1 of signal (2) is a gate signal for obtaining first reproducing waveform 607. However, an actual recording and reproducing apparatus has a following error factor. Signal (3) indicates an optical waveform of light source 201 modulated by modulated signal 601. Due to a signal delay inside recording circuit 106 or an influence of a wiring from recording circuit 106 to light source 201, an actual optical waveform is delayed by time td from modulated signal 601. Signal (4) indicates reproducing waveform 606 which is an output waveform of optical detector 207 which has received reflected light from recording medium 101, by second optical spot 103 modulated based on an actual optical waveform. A reproducing waveform of information recorded by first optical spot 102 is actually superimposed on the waveform of signal (4). However, the reproducing waveform will not be described for ease of description.

A waveform of reproducing waveform 606 is distorted by an influence of frequency characteristics of second photodetector 209 or the head amplifier circuit which is not illustrated. For example, ringing occurs at broken line portion 1001 of signal (4) in some cases. When the waveform of signal (4) is gated by a gate signal of signal (2), part of a multi-pulse waveform indicated by broken line portion 1002 or a ringing waveform indicated by broken line portion 1001 is included in gate time Tw1, and reproducing signal quality is influenced.

By contrast with this, signal (5) is an example of a gate signal which avoids this influence, and is set to gate time Tw2 at which part of a multi-pulse waveform indicated by broken line portion 1002 or a ringing waveform indicated by broken line portion 1001 is not included.

Thus, by setting shorter gate time Tw2 than gate time Tw1 at which recording circuit 106 causes light source 201 to emit beams at a constant light amount, it is possible to gate reproducing waveform 606 well without an influence of waveform distortion due to signal delay or ringing, and more precisely perform recording quality evaluation.

In addition, only a timing of a rising portion of a gate signal has been changed for signal (5). However, a timing of a falling portion may be changed in response to distortion or delay of reproducing waveform 606.

Further, how short a time is set is desirably set appropriately based on performance of recording and reproducing apparatus 600 as described with reference to signal (4) and signal (5).

Reproducing waveform 606 such as signal (4) which does not include a reproducing waveform of recorded marks and spaces can be easily observed by a method for modulating a light source at a low power setting where marks are not recorded on recording medium 101 or using a test disc on which a reflection film such as an aluminum film is evaporated instead of a recording film. It is possible to obtain appropriate gate time Tw2 based on this waveform.

[2-2. Effect and Others]

As described above, in the present exemplary embodiment, a recording and reproducing apparatus includes light source 201, an optical system configured to divide a beam from light source 201, and to form first optical spot 102 and second optical spot 103 on recording medium 101, recording circuit 106 configured to drive light source 201 and to modulate a light amount of light source 201, and further to record the information on recording medium 101 by first optical spot 102 by modulating the light amount of light source 201 based on information, and evaluation circuit 110 configured to evaluate the information recorded on recording medium 101 by reproducing by second optical spot 103 in a period in which recording circuit 106 causes light source 201 to emit beams at a constant light amount.

Further, if the above period is a first period, a period other than the first period is a second period, first reproducing waveform 607 is a waveform generated by reproducing the information recorded on recording medium 101 by second optical spot 103 in the first period, and second reproducing waveform 612 is a waveform generated based on source information, which is recorded on recording medium 101, corresponds to the information reproduced by second optical spot 103 in the second period, evaluation circuit 110 evaluates an arithmetic result of first reproducing waveform 607 and second reproducing waveform 612.

Furthermore, evaluation circuit 110 determines an offset amount for performing an arithmetic operation on first reproducing waveform 607 and second reproducing waveform 612 based on a first average level and a second average level included in source information recorded on recording medium 101, the first average level is an average level of marks and spaces having a first data length, the second average level is an average level of marks and spaces having a second data length different from the first data length.

Consequently, upon evaluating reproduction from second optical spot 103, an influence of waveform distortion due to a multi-pulse is not generated, and it is possible to realize good recording quality evaluation by using a method such as the PRML signal processing or error rate evaluation.

(Third Exemplary Embodiment)

In the second exemplary embodiment, high quality reproduction evaluation of recorded information in a period in which light source 201 emits beams at a constant light amount is performed while information is recorded on recording medium 101. Hence, while there is an advantage that it is possible to check a recording state of information at all times, signal processing like synthesizing waveforms tends to be complicated.

Hence, in the present exemplary embodiment, a recording circuit causes a light source to emit beams at a constant light amount in a first gap region of a predetermined length included in information which needs to be recorded, and at the same time, an evaluation circuit evaluates information reproduced by a second optical spot.

Next, the third exemplary embodiment will be described with reference to FIGS. 11 to 15.

[3-1. Configuration]

Figure 11:
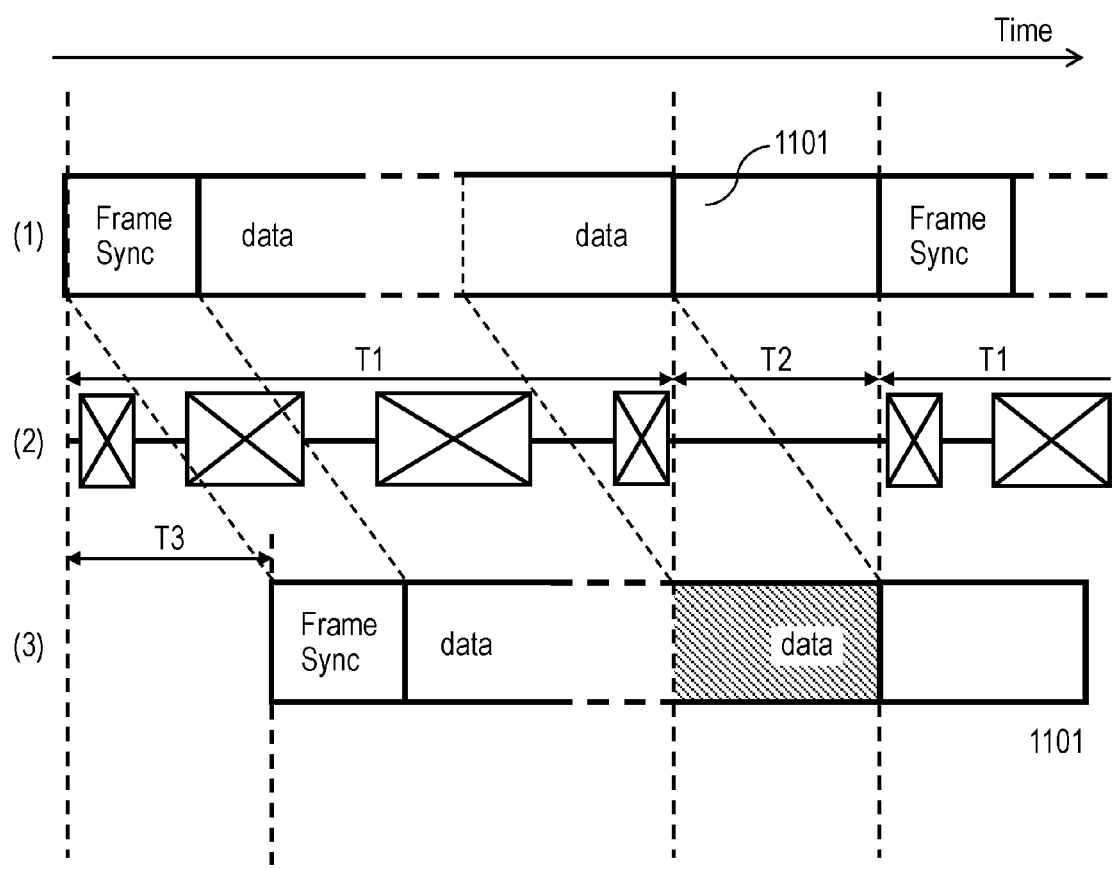
FIG. 11 is a view for explaining an outline of reproduction evaluation according to a third exemplary embodiment.

FIG. 11 is a view for explaining an outline of reproduction evaluation according to the third exemplary embodiment. Recording frame (1) schematically illustrates a recoding frame. In recording frame (1), first gap region 1101 is provided next to a Frame Sync portion and a data portion. Signal (2) indicates modulated signal 601 of light source 201 for recording corresponding to recording frame (1). Modulated signal 601 is a modulated signal including a multi-pulse in time period T1 in which the Frame Sync portion and data are recorded, and is set to constant light amount Pe in time period T2 corresponding to first gap region 1101.

Reproducing data (3) indicates data which can be reproduced by second optical spot 103 from recording medium 101. Information recorded on recording medium 101 by first optical spot 102 reaches second optical spot 103 after delay time T3 determined based on a spot spacing between first optical spot 102 and second optical spot 103 on recording medium 101 and a linear velocity of recording medium 101.

As described above, second optical spot 103 can reproduce the data of a hatching portion of reproducing data (3) in time period T2 in which light source 201 emits beams at constant light amount Pe. Further, by using the data portion of the hatching portion, evaluation circuit 110 can perform high quality evaluation by using a method such as PRML signal processing and error rate evaluation. Thus, information is reproduced by second optical spot 103 by using first gap region 1101, it is possible to perform good recording quality evaluation without an influence of waveform distortion due to a multi-pulse.

Generally, according to optical recording, Direct Current (DC) control is performed upon data recording to perform good recording and reproducing. In order to suppress a DC component of a recording signal or a reproducing signal, recording marks and spaces are controlled such that each mark length and each space length recorded on recording medium 101 are accumulated nearly equally. In the case of, for example, a rewritable BD, data for DC controlling of one bit is inserted at several portions in a recording frame. However, in the case of first gap region 1101 of recording frame (1) in FIG. 11, a relatively long space portion is recorded. Therefore, it is difficult to control the DC control by control bits for DC controlling at several portions in some cases.

Figure 12:
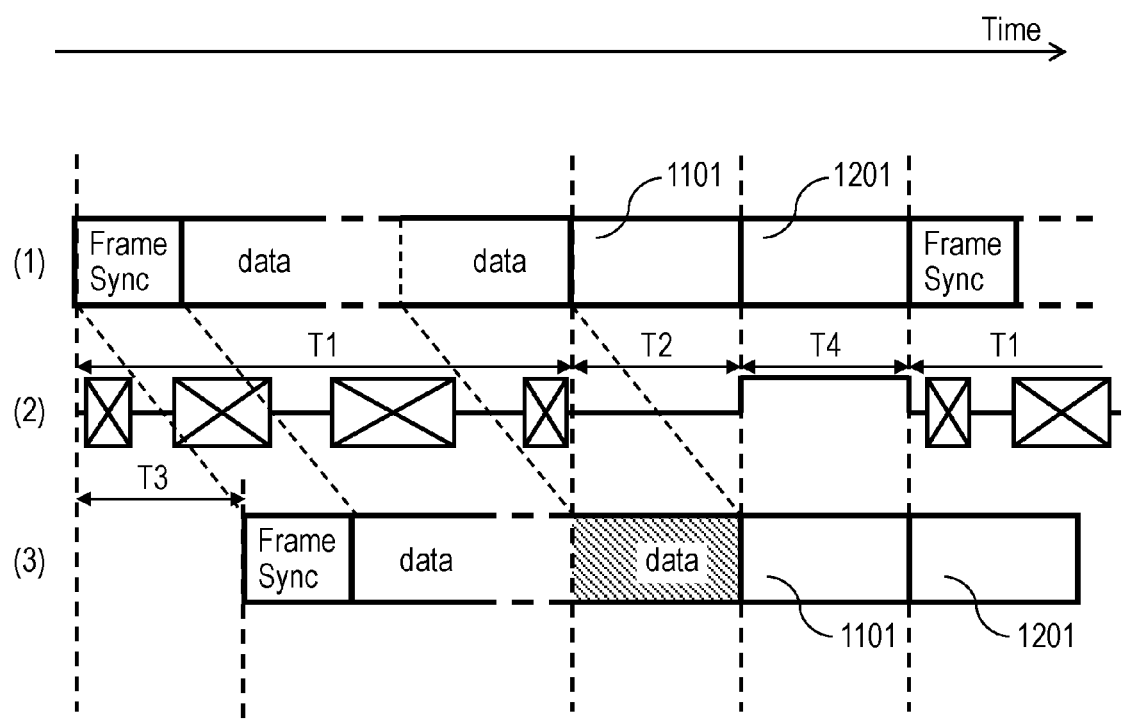
FIG. 12 is another view for explaining an outline of reproduction evaluation according to the third exemplary embodiment.

FIG. 12 is another view for explaining the outline of reproducing evaluation according to the third exemplary embodiment. Even when a long space portion such as first gap region 1101 of recording frame (1) in FIG. 11 is recorded, DC control is enabled. In FIG. 12, in recording frame (1), first gap region 1101 is provided next to a Frame Sync portion and a data portion, and second gap region 1201 having substantially the same data length as the data length of first gap region 1101 is provided next to first gap region 1101.

Modulated signal (2) indicates modulated signal 601 of light source 201 for recording corresponding to recording frame (1). Modulated signal (2) is a modulated signal including a multi-pulse in time period T1 in which the Frame Sync portion or the data portion are recorded, and is set to constant light amount Pe in time period T2 corresponding to first gap region 1101. Subsequently, in time period T4 corresponding to second gap region 1201, light emission is set at constant light amount Pw different from that of time period T2 corresponding to first gap region 1101. In this case, on recording medium 101, spaces are recorded by first optical spot 102 in time period T2, and marks are recorded by first optical spot 102 in time period T4.

Thus, first gap region 1101 and second gap region 1201 keep a balance so that each space length and each mark length recorded on recording medium 101 are equally accumulated. Hence, it is possible to control a DC control upon recording data and to reproduce a good signal by suppressing DC components.

Reproducing data (3) indicates data which can be reproduced by second optical spot 103 from recording medium 101. Information recorded on recording medium 101 by first optical spot 102 reaches second optical spot 103 after delay time T3 determined based on a spot spacing between first optical spot 102 and second optical spot 103 on recording medium 101 and a linear velocity of recording medium 101. As described above, second optical spot 103 can reproduce the data portion of a hatching portion of reproducing data (3) in time period T2 in which light source 201 emits beams at constant light amount Pe. Further, by using the data of the hatching portion, evaluation circuit 110 can perform high quality evaluation by using a method such as PRML signal processing and error rate evaluation.

According to modulated signal (2), in time period T4 corresponding to second gap region 1201, light source 201 emits beams at constant light amount Pw, and information is not reproduced by second optical spot 103 in time period T4. Therefore, there is no problem that every beam is emitted by using a multi-pulse in time period T4.

In addition, light source 201 may be set to emit beams at constant light amount Pw in time period T2 corresponding to first gap region 1101, and light source 201 may be set to emit beams at constant light amount Pe in time period T4 corresponding to second gap region 1201. First optical spot 102 records marks in time period T2. Modulated signal (2)

does not include a multi-pulse in time period T2, and therefore there is no problem that information is reproduced by second optical spot 103. As described above, when marks are recorded without using a multi-pulse, the marks become teardrop-shaped. However, it is not necessary to reproduce these marks with high quality, and therefore there is no problem. Further, the light amount of light source 201 in first gap region 1101 and second gap region 1201 is not limited to light level Pe or Pw. The light amount corresponding to Pe may be a light amount at which spaces are recorded on recording medium 101 and Pw may be a light amount at which marks are recorded likewise.

Figure 13:
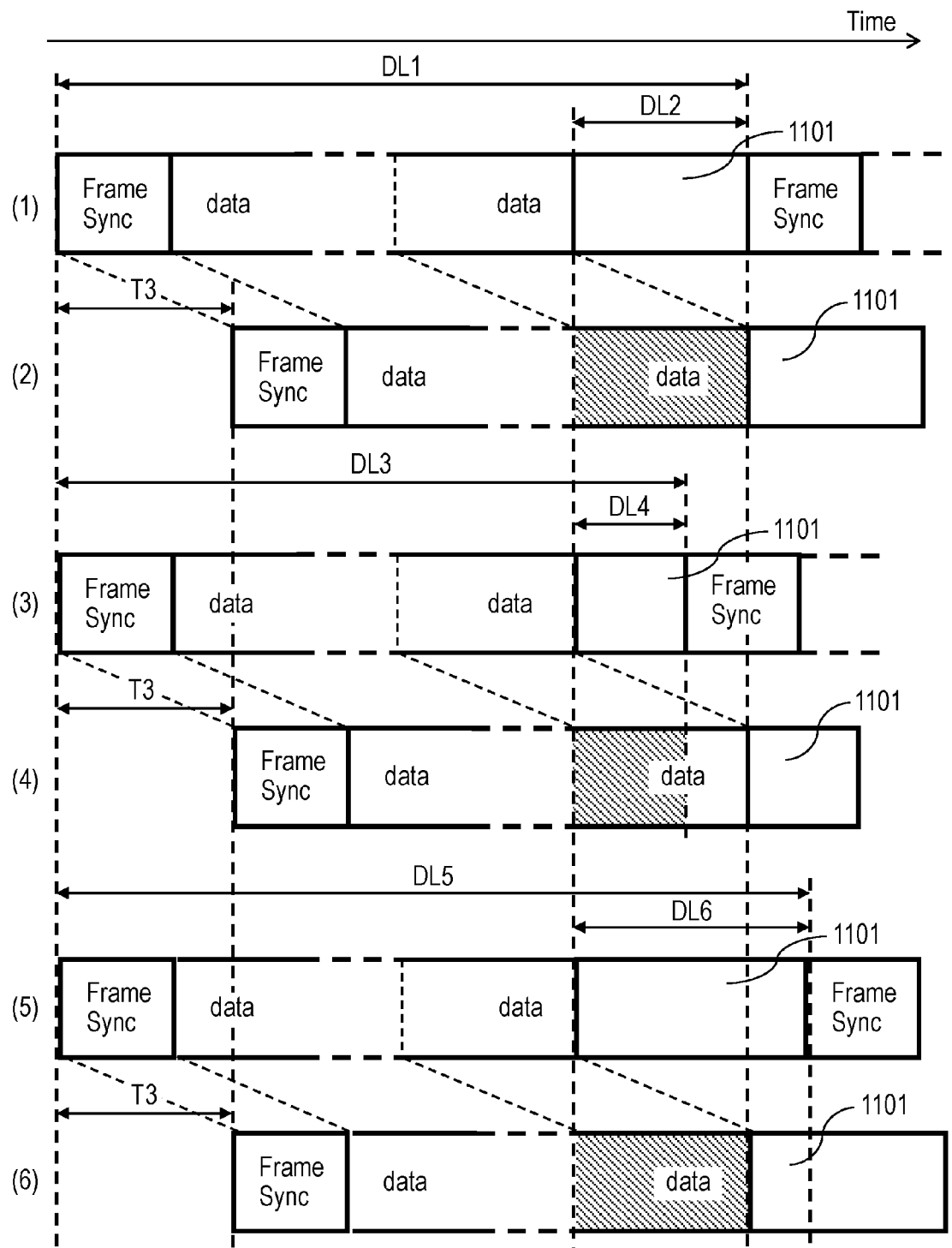
FIG. 13 is still another view for explaining an outline of reproduction evaluation according to the third exemplary embodiment.

FIG. 13 is still another view for explaining the outline of reproducing evaluation. A data length of first gap region 1101 will be described with reference to FIG. 13.

Recording frame (1) and reproducing data (2) are the same as recording frame (1) and recording data (2) in FIG. 11. A data length of recording frame (1) is DL1, and a data length of the first gap region is DL2. Data length DL2 is nearly equal to a data length corresponding to delay time T3. In this case, as to information recorded on recording medium 101, a hatching portion of reproducing data (2) is a data portion which is just before first gap region 1101, and this data portion can be entirely reproduced in a time corresponding to data length DL2.

Next, recording frame (3) indicates a case where data length DL4 of first gap region 1101 is shorter than the data length corresponding to delay time T3. Data length DL4 is shorter than a data length corresponding to delay time T3, and therefore the hatching portion of reproducing data (4) which can be reproduced in the information recorded on recording medium 101 shorter than that of reproducing data (2). The data length which can be reproduced is short compared to recording frame (1). However, "data length DL4/data length DL3" which is a rate of first gap region 1101 which occupies in recording frame (3) is small. Consequently, it is possible to reduce an influence of a decrease in a user data capacity caused by addition of first gap region 1101 in a recording frame compared to recording frame (1). In this regard, when data length DL4 is shortened too much, a data amount which can be reproduced decreases. Therefore, evaluation circuit 110 has difficulty in performing high quality evaluation by using a method such as PRML signal processing or error rate evaluation. Hence, data length DL4 is desirably set optimally while taking into account an influence on a user data capacity and a necessary reproducing data amount.

Next, recording frame (5) indicates a case where data length DL6 of first gap region 1101 is longer than the data length corresponding to delay time T3. Data length DL6 is longer than a data length corresponding to delay time T3. In reproducing data (6), a data portion in a time corresponding to data length DL6 can be reproduced. However, a portion subsequent to a hatching portion of reproducing data (6) is part of first gap region 1101 instead of user data. Therefore, no advantage is obtained by increasing the data length of first gap region 1101 to data length DL6, and there is only a disadvantage that "data length DL6/data length DL5" which is a rate of first gap region 1101 which occupies in recording frame (5) is large.

Hence, the data length of first gap region 1101 is desirably set equal to a data length corresponding to delay time T3 determined based on a spot spacing between first optical spot 102 and second optical spot 103 on recording medium 101 and a linear velocity of recording medium 101, or is desirably set to a range shorter than this data length.

In addition, only the recording frame including first gap region 1101 has been described as an example with reference to FIG. 13. The same also applies to a configuration including second gap region 1201 in addition to first gap region 1101.

In the present exemplary embodiment, reproducing recorded information is evaluated by using first gap region 1101, and therefore reproduction evaluation upon DRAW is performed by sampling part of recording frames instead of using all recording frames. There is a method for increasing a sampling frequency or increasing a sampling data amount when it is necessary to further improve reproduction evaluation equality. As illustrated in FIG. 13, no advantage is obtained even by increasing a sampling data amount compared to a data amount corresponding to delay time T3.

Figure 14:
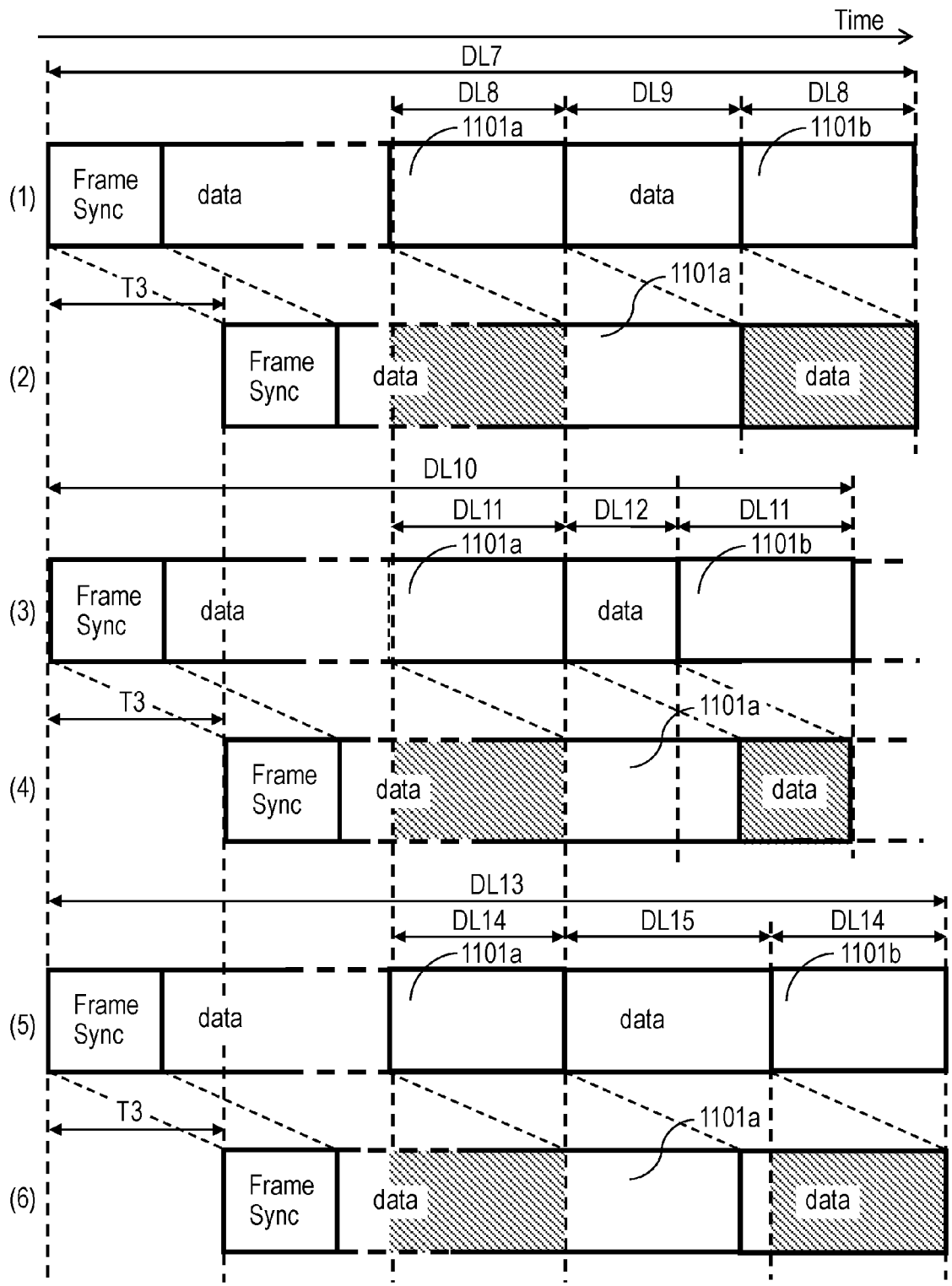
FIG. 14 is yet still another view for explaining an outline of reproduction evaluation according to the third exemplary embodiment.

FIG. 14 is still another view for explaining an outline of reproduction evaluation according to the third exemplary embodiment. In FIG. 14, a sampling frequency for reproduction evaluation upon DRAW is increased, i.e., first gap regions 1101 are provided at a plurality of portions in a recording frame. FIG. 14 illustrates a case where first gap regions 1101 are provided at two portions.

In FIG. 14, a data portion is provided between two first gap regions 1101a and 1101b. In recording frame (1), data lengths of two first gaps 1101a and 1101b are each data length DL8, and a data length of the data portion between first gap regions 1101a and 1101b is data length DL9, and both data length DL8 and DL9 are equally set to the data length corresponding to delay time T3 of reproducing data (2). In this case, it is found that a first hatching portion of reproducing data (2) is a data portion which is just before first gap region 1101a, this data portion can be entirely reproduced in a time corresponding to data length DL8, further, a second hatching portion of reproducing data (2) is a data portion which is just before first gap region 1101b, and this data portion can be entirely reproduced in the time corresponding to data length DL8.

Next, recording frame (3) indicates a case where data length DL12 of a data portion between two first gap regions 1101a and 1101b is shorter than the data length corresponding to delay time T3. In this case, a first hatching portion of reproducing data (4) is a data portion which is just before first gap region 1101a, and this data portion can be entirely reproduced in a time corresponding to data length DL11. However, a second hatching portion of reproducing data (4) is a data portion which is just before first gap region 1101b. However, data length DL12 of the data portion is shorter than a data length corresponding to delay time T3. First one third of the data portion in a time corresponding to data length DL11 is first gap region 1101a, and the data portion which can be reproduced is short.

Next, recording frame (5) indicates a case where data length DL15 of a data portion between two first gap regions 1101a and 1101b is longer than the data length corresponding to delay time T3. In this case, a first hatching portion of reproducing data (6) is a data portion which is just before first gap region 1101a, and this data portion can be entirely reproduced in a time corresponding to data length DL14. A second hatching portion of reproducing data (6) is a data portion which is just before first gap region 1101b. Data length DL15 of the data portion is longer than the data length corresponding to delay time T3. Consequently, a data amount equal to the data amount of reproducing data (2) can be reproduced.

Hence, when a plurality of first gap regions is provided, an interval between an arbitrary first gap region 1101 and a next first gap region is desirably set equal to a data length corresponding to delay time T3 determined based on a spot spacing between first optical spot 102 and second optical spot 103 on recording medium 101 and a linear velocity of recording medium 101, or is desirably set to a range longer than this data length.

In addition, FIG. 14 illustrates a case where a plurality of first gap regions is provided. However, the same applies to a case where a second gap region is provided next to the first gap region as illustrated in FIG. 12. In this case, an interval between an arbitrary first gap region 1101 and a next first gap region is desirably set equal to a data length which is twice as a data length corresponding to delay time T3 determined based on a spot spacing between first optical spot 102 and second optical spot 103 on recording medium 101 and a linear velocity of recording medium 101, or is desirably set to a range longer than this data length.

In addition, as described with reference to FIGS. 11 to 14, first gap region 1101 and second gap region 1201 have been provided in a recording frame, and may be provided in all recording frames or may be discretely provided in recording frames instead of in all recording frames.

Figure 15A:
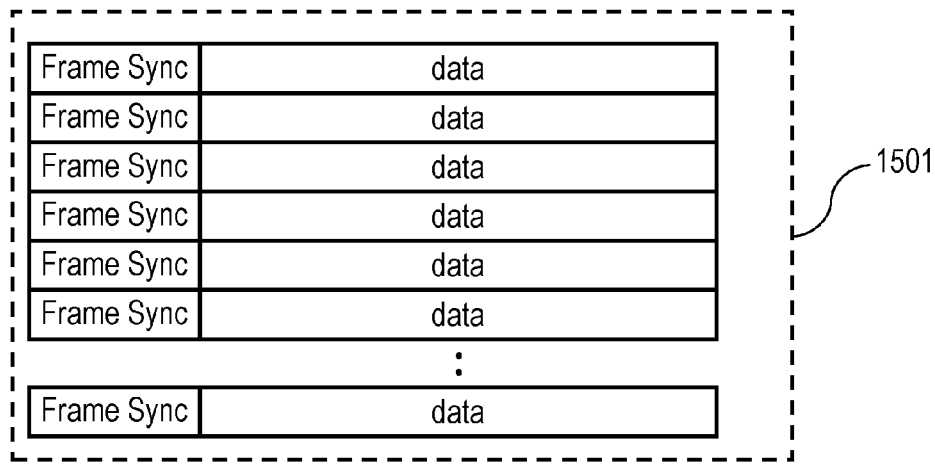
FIG. 15A is a view for explaining a recording block according to the third exemplary embodiment.

A more specific example will be described with reference to FIGS. 15A to 15C. FIG. 15A is a view illustrating a recording block including a plurality of recording frames. In the case of, for example, a rewritable BD, 496 recording frames configure one recording block 1501.

Figure 15B:
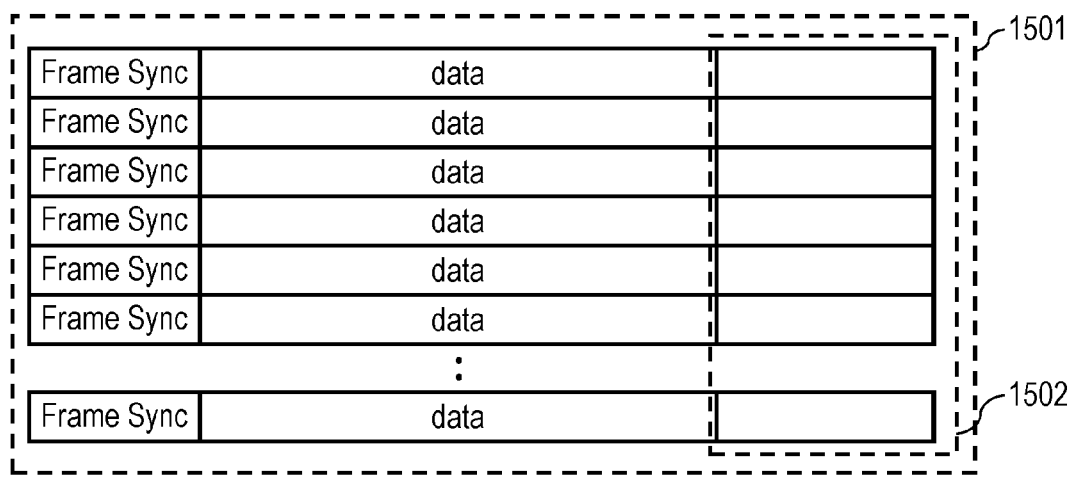
FIG. 15B is another view for explaining a recording block according to the third exemplary embodiment.

FIG. 15B is a view illustrating another recording block including a plurality of recording frames. Gap region 1502 is provided at a tail of each recording frame. In gap region 1502, a first gap region, a second gap region or a plurality of first gap regions or second gap regions is provided as described in FIGS. 11 to 14. Gap region 1502 may be provided in the middle of a recording frame.

Figure 15C:
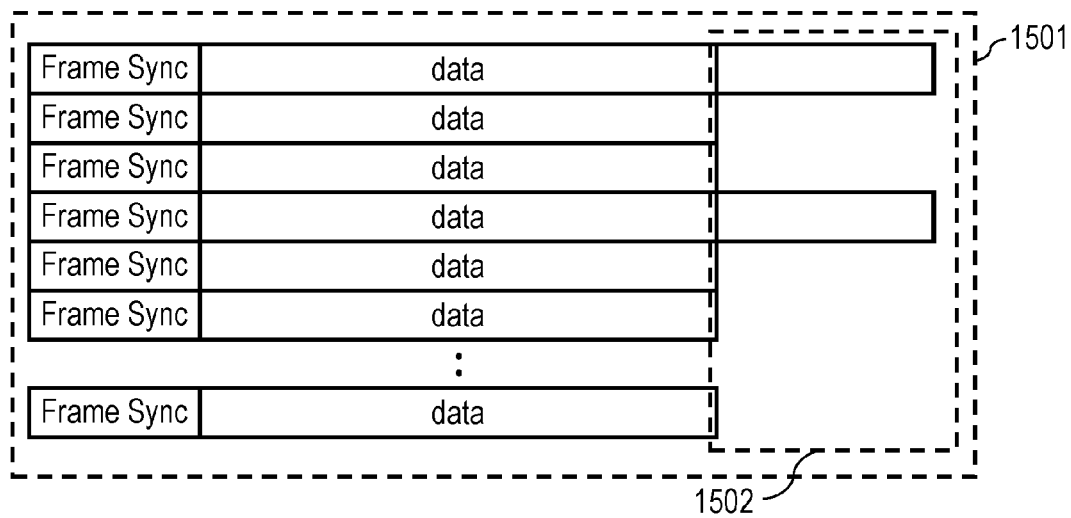
FIG. 15C is still another view for explaining a recording block according to the third exemplary embodiment.

FIG. 15C is a view illustrating still another recording block including a plurality of recording frames. In FIG. 15C, one gap region 1502 is provided every three other recording frames.

As described above, gap regions 1502 may be provided at an arbitrary frequency in recording block 1501 by taking into account a balance between a sampling frequency upon DRAW and an influence on a user data capacity.

[3-2. Effect and Others]

As described above, in the present exemplary embodiment, recording and reproducing apparatus 100 includes light source 201, an optical system configured to divide a beam from light source 201, and to form first optical spot 102 and second optical spot 103 on recording medium 101, recording circuit 106 configured to drive light source 201 and to modulate a light amount of light source 201, and further to record the information on recording medium 101 by first optical spot 102 by modulating the light amount of light source 201 based on information, and evaluation circuit 110 configured to evaluate the information recorded on recording medium 101 by reproducing by second optical spot 103 in a period in which recording circuit 106 causes light source 201 to emit beams at a constant light amount.

Further, the information recorded on recording medium 101 includes a first gap region having a predetermined data length, and a period corresponding to the first gap region is a period in which recording circuit 106 causes light source 201 to emit beams at a constant light amount.

Thus, information is reproduced by the second optical spot by using the first gap region. Consequently, it is possible to perform good recording quality evaluation without an influence of waveform distortion due to a multi-pulse.

(Other Exemplary Embodiments)

The first to third exemplary embodiments have been described above as illustrative techniques of the present disclosure. However, the techniques according to the present disclosure are not limited to these, and are applicable to exemplary embodiments which are changed, replaced, added or omitted. Further, it is also possible to provide new exemplary embodiments by combining components described in the first and third exemplary embodiments.

Hereinafter, the other exemplary embodiments will be illustratively described.

(1) In the second and third exemplary embodiments, a case where evaluation circuit 110 evaluates a reproducing signal from second optical spot 103 with high quality by using a method such PRML signal processing and error rate evaluation has been described. A method for using two types of a combination of marks and spaces including different data lengths will be described as another method.

Whether or not information is appropriately recorded by first optical spot 102 on recording medium 101, is evaluated based on a reproducing signal of second optical spot 103 according to DRAW. However, there are two main factors that information cannot be appropriately recorded.

The first factor is that information is not recorded with appropriate recording power. This factor generally derives from an error in recording power calibration of test recording carried out before user data is recorded, or from a fluctuation of recording power due to dirt of recording medium 101.

The second factor is that information cannot be appropriately recorded due to an influence of a damage or a defect on recording medium 101. This second factor can be detected to some degree by monitoring an output amplitude from first photodetector 208 on optical detector 207 by using reflected light from recording medium 101 during recording by first optical spot 102.

Hence, according to DRAW, it is important to detect whether recording power which is the first factor is appropriate. As one of indices for evaluating appropriateness of recording power, Asymmetry is generally used.

Figure 16:
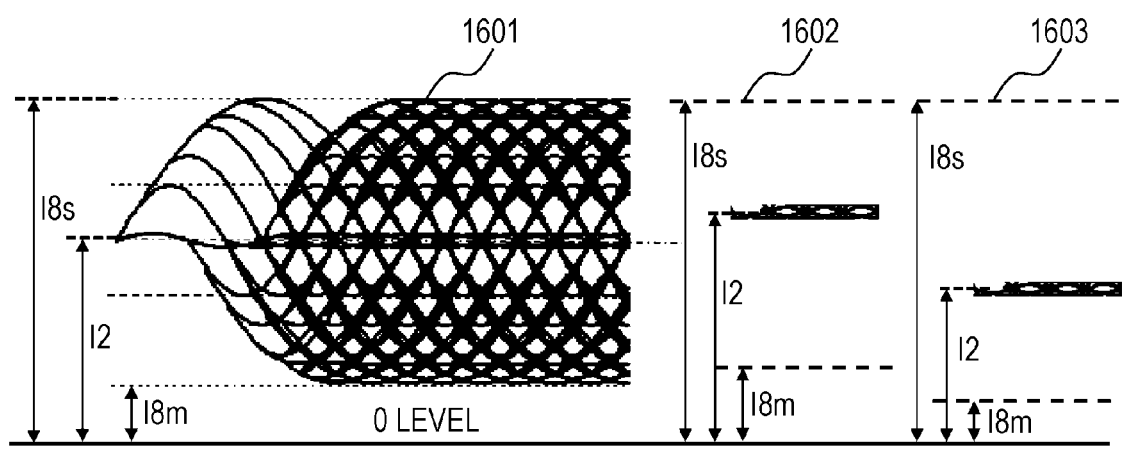
FIG. 16 is a view for explaining Asymmetry of a BD according to another exemplary embodiment.

FIG. 16 is a view for explaining Asymmetry of a rewritable BD. In FIG. 16, waveform 1601 is a reproducing signal waveform in case where recording is performed with ideal recording power. Signal level I8s indicates a signal level of 8T spaces, signal level I8m indicates a signal level of 8T marks and signal level I2 indicates an average level of 2T signals.

Asymmetry can be expressed as a following equation.

$$\text{Asymmetry} = ((I8s+I8m)/2 - I2)/(I8s-I8m)$$

This equation represents a rate of a difference between an average level of 8T signals ((I8s+I8m)/2) and an average level of 2T signals (I2) with respect to an 8T signal amplitude (I8s−I8m).

When average level I2 of the 2T signals is in the center of the 8T signal amplitude, Asymmetry=0 holds and corresponds to waveform 1601.

Waveform 1602 is a reproducing signal waveform in case where recording is performed with low recording power. In this regard, waveforms of 3T to 8T signals are not illustrated in waveform 1602 for viewability. In waveform 1602, Asymmetry <0 holds.

Waveform 1603 is a reproducing signal waveform in case where recording is performed with high recording power. Similar to waveform 1602, waveforms of 3T to 8T signals are not illustrated in waveform 1603, either. In waveform 1603, Asymmetry >0 holds.

Thus, it is possible to determine whether or not recording power is appropriate based on Asymmetry. Hence, signal components of 8T marks and 8T spaces and signal components of 2T marks and 2T spaces are extracted from waveform for evaluation 613 described with reference to FIG. 6, and each average level is detected. By this means, Asymmetry is calculated, and whether or not recording power is appropriate, i.e., whether or not information is appropriately recorded by first optical spot 102 on recording medium 101 is evaluated.

When signal processing is performed on a digital signal, it is possible to easily find 8T or 2T signals of a predetermined length based on a data point of a sampled signal waveform, as for extracting 8T or 2T signal components. When signal processing is performed on an analog signal, each signal component needs to be extracted by using, for example, a narrow band filter corresponding to the 8T signals or 2T signals.

According to the configuration in FIG. 11, too, at a timing of first gap region 1101, signal components of 8T marks and 8T spaces and signal components of 2T marks and 2T spaces are extracted from a signal reproduced by second optical spot 103, and each average level is detected. By this means, Asymmetry is calculated, and whether or not recording power is appropriate, i.e., whether or not information is appropriately recorded by first optical spot 102 on recording medium 101 is evaluated.

The configuration in FIG. 11 may employ a more simple method for providing 8T marks 8T spaces, and 2T marks and 2T spaces in a Frame Sync portion. In addition, 9T may be substituted with 8T. Further, in a recording frame, first gap region 1101 is provided backward from a start position of the Frame Sync portion by a data length corresponding to delay time T3. That is, at a timing of first gap region 1101, second optical spot 103 reproduces the Frame Sync portion recorded on recording medium 101. Thus, 8T signals and 2T signals included in the Frame Sync portion are detected, and whether or not recording power is appropriate is evaluated based on Asymmetry. Naturally, at an appropriate position in a recording frame which can be reproduced in first gap region 1101 instead of the Frame Sync portion, 8T or 2T areas may be added.

In addition, in each case, a signal for calculating Asymmetry is not limited to a combination of the 8T signals and the 2T signals, and two types of signals of different data lengths can be used. Further, when a difference between the data lengths of the two types of signals is greater, detection sensitivity for Asymmetry desirably is high.

(2) As described above, it is possible to detect appropriateness of recording power by using Asymmetry. Consequently, it is possible to control a light amount of light source 201 according to Asymmetry. That is, recording circuit 106 controls the light amount of light source 201 to make the light amount increase in the case of Asymmetry <0 and, by contrast with this, to make the light source decrease in the case of Asymmetry >0 such that the light amount takes a value close to Asymmetry=0. Consequently, it is possible to not only evaluate recording quality according to DRAW but also correct a recording state better. This correction can be carried out in real time during recording. Hence, this correction is also effective for a decrease in recording power due to a partial dirt attached onto recording medium 101.

In addition, Asymmetry=0 is an example which assumes ideal recording and reproducing. When Asymmetry in recording medium 101 or recording and reproducing apparatus 100 is offset from 0, an offset Asymmetry value is a target value for light amount correction.

What is claimed is:

1. A recording and reproducing apparatus comprising:
a light source;
an optical system configured to divide a beam from the light source, and to form a first optical spot and a second optical spot on a recording medium;
a recording circuit configured to drive the light source and to modulate a light amount of the light source, and further to record the information on the recording medium by the first optical spot by modulating the light amount of the light source based on information to record; and
an evaluation circuit configured to evaluate the information recorded on the recording medium by reproducing by the second optical spot in a period in which the recording circuit causes the light source to emit the beam at a constant light amount,
wherein, if the period is a first period,
a period other than the first period is a second period,
a first reproducing waveform is a waveform generated by reproducing the information recorded on the recording medium by the second optical spot in the first period, and
a second reproducing waveform is a waveform generated based on source information, which is recorded on the recording medium, corresponding to the information reproduced by the second optical spot in the second period,
the evaluation circuit evaluates a generated waveform which is generated from the first reproducing waveform and the second reproducing waveform.

2. The recording and reproducing apparatus according to claim 1, further comprising a waveform correction circuit configured to correct a frequency characteristic,
wherein the waveform correction circuit corrects the second reproducing waveform.

3. The recording and reproducing apparatus according to claim 2, wherein the waveform correction circuit includes a frequency characteristics correction circuit which corrects the frequency characteristic, a delay circuit which delays a signal, and a gain circuit which adjusts an amplitude of a signal by a gain, and
the waveform correction circuit determines at least one of a delay amount of the delay circuit and a gain of the gain circuit by using a predetermined signal included in the source information recorded on the recording medium.

4. The recording and reproducing apparatus according to claim 1, wherein the evaluation circuit determines an offset amount for performing an arithmetic operation on the first reproducing waveform and the second reproducing waveform based on a first average level and a second average level included in the source information recorded on the recording medium, the first average level is an average level of a mark and a space having a first data length, and the second average level is an average level of a mark and a space having a second data length different from the first data length.

5. The recording and reproducing apparatus according to claim 4, wherein
the first data length is longer than the second data length, and
the recording circuit records the mark and the space having the first data length prior to the mark and the space having the second data length.

6. The recording and reproducing apparatus according to claim 1, wherein the first period is a period which is a predetermined time shorter in a period in which the light source is emitted the beam at a constant amount of light.

7. The recording and reproducing apparatus according to claim 1, wherein the evaluation circuit evaluates based on a first average level and a second average level of a signal reproduced by the second optical spot, the first average level is an average level of a mark and a space having a first data length, and the second average level is an average level of a mark and a space having a second data length different from the first data length.

8. The recording and reproducing apparatus according to claim 7, wherein the recording circuit controls the light amount of the light source based on a result of the evaluation circuit.

9. A recording and reproducing apparatus comprising:
a light source;
an optical system configured to divide a beam from the light source, and to form a first optical spot and a second optical spot on a recording medium;
a recording circuit configured to drive the light source and to modulate a light amount of the light source, and further to record the information on the recording medium by the first optical spot by modulating the light amount of the light source based on information to record; and
an evaluation circuit configured to evaluate the information recorded on the recording medium by reproducing by the second optical spot in a period in which the recording circuit causes the light source to emit the beam at a constant light amount,
wherein
the information recorded on the recording medium includes a first gap region having a predetermined data length, and
a period corresponding to the first gap region is a period in which the recording circuit causes the light source to emit the beam at a constant light amount,
wherein
the information recorded on the recording medium further includes a second gap region having a data length which is nearly equal to the data length having the first gap region, and
a period in which the recording circuit causes the light source to emit the beam at a first constant light amount is a period corresponding to the first gap region, and a period in which the recording circuit causes the light source to emit the beam at a second constant light amount different from the first light amount is a period corresponding to the second gap region.

10. A recording and reproducing apparatus comprising:
a light source;
an optical system configured to divide a beam from the light source, and to form a first optical spot and a second optical spot on a recording medium;
a recording circuit configured to drive the light source and to modulate a light amount of the light source, and further to record the information on the recording medium by the first optical spot by modulating the light amount of the light source based on information to record; and
an evaluation circuit configured to evaluate the information recorded on the recording medium by reproducing by the second optical spot in a period in which the recording circuit causes the light source to emit the beam at a constant light amount,
wherein
the information recorded on the recording medium includes a first gap region having a predetermined data length, and
a period corresponding to the first gap region is a period in which the recording circuit causes the light source to emit the beam at a constant light amount,
wherein the data length of the first gap region is shorter than a data length corresponding to a spacing between the first optical spot and the second optical spot on the recording medium.

11. A recording and reproducing apparatus comprising:
a light source;
an optical system configured to divide a beam from the light source, and to form a first optical spot and a second optical spot on a recording medium;
a recording circuit configured to drive the light source and to modulate a light amount of the light source, and further to record the information on the recording medium by the first optical spot by modulating the light amount of the light source based on information to record; and
an evaluation circuit configured to evaluate the information recorded on the recording medium by reproducing by the second optical spot in a period in which the recording circuit causes the light source to emit the beam at a constant light amount,
wherein
the information recorded on the recording medium includes a first gap region having a predetermined data length, and
a period corresponding to the first gap region is a period in which the recording circuit causes the light source to emit the beam at a constant light amount,
wherein
a plurality of the first gap regions is included in a predetermined range of the information recorded on the recording medium, and
an interval between the first gap region and the another first gap region is longer than a data length corresponding to a spacing between the first optical spot and the second optical spot on the recording medium.

* * * * *